US011537139B2

(12) United States Patent
Rankawat et al.

(10) Patent No.: US 11,537,139 B2
(45) Date of Patent: Dec. 27, 2022

(54) DETERMINING DRIVABLE FREE-SPACE FOR AUTONOMOUS VEHICLES

(71) Applicant: NVIDIA Corporation, San Jose, CA (US)

(72) Inventors: Mansi Rankawat, Santa Clara, CA (US); Jian Yao, Sunnyvale, CA (US); Dong Zhang, Fremont, CA (US); Chia-Chih Chen, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 279 days.

(21) Appl. No.: 16/355,328

(22) Filed: Mar. 15, 2019

(65) Prior Publication Data
US 2019/0286153 A1 Sep. 19, 2019

Related U.S. Application Data

(60) Provisional application No. 62/643,665, filed on Mar. 15, 2018.

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G06K 9/6274* (2013.01);
(Continued)

(58) Field of Classification Search
None
See application file for complete search history.

(56) References Cited

U.S. PATENT DOCUMENTS 7,409,295 B2  8/2008 Paradie
8,204,542 B2  6/2012 Liao et al.
(Continued)

FOREIGN PATENT DOCUMENTS

DE  10 2013 208 521 A1  11/2014
DE  10 2015 221 920 A1  5/2017
(Continued)

OTHER PUBLICATIONS

Garnett et al., "Real-time category-based and general obstacle detection for autonomous driving", Oct. 22, 2017, IEEE International Conference on Computer Vision Workshops (ICCVW), p. 198-205.*

(Continued)

*Primary Examiner* — Tamara L Weber
(74) *Attorney, Agent, or Firm* — Taylor English Duma L.L.P.

(57) ABSTRACT

In various examples, sensor data may be received that represents a field of view of a sensor of a vehicle located in a physical environment. The sensor data may be applied to a machine learning model that computes both a set of boundary points that correspond to a boundary dividing drivable free-space from non-drivable space in the physical environment and class labels for boundary points of the set of boundary points that correspond to the boundary. Locations within the physical environment may be determined from the set of boundary points represented by the sensor data, and the vehicle may be controlled through the physical environment within the drivable free-space using the locations and the class labels.

20 Claims, 15 Drawing Sheets

(51) Int. Cl.
- *G06N 3/08* (2006.01)
- *G06T 7/11* (2017.01)
- *G06K 9/62* (2022.01)
- *G06V 20/58* (2022.01)
- *G06V 20/56* (2022.01)
- *G06V 30/194* (2022.01)

(52) U.S. Cl.
CPC .................. *G06N 3/08* (2013.01); *G06T 7/11* (2017.01); *G06V 20/58* (2022.01); *G06V 20/588* (2022.01); *G06V 30/194* (2022.01); *G05D 2201/0213* (2013.01); *G06T 2207/30252* (2013.01)

(56) References Cited

U.S. PATENT DOCUMENTS

| | | | |
|---|---|---|---|
| 8,204,642 B2 | 6/2012 | Tanaka et al. | |
| 9,098,751 B2 | 8/2015 | Hilldore et al. | |
| 9,373,057 B1 | 6/2016 | Erhan et al. | |
| 9,489,635 B1 | 11/2016 | Zhu | |
| 9,623,905 B2 | 4/2017 | Shashua et al. | |
| 9,701,307 B1 | 7/2017 | Newman et al. | |
| 9,710,714 B2 | 7/2017 | Chen et al. | |
| 9,721,471 B2 | 8/2017 | Chen et al. | |
| 9,742,869 B2 | 8/2017 | Bolotin et al. | |
| 10,007,269 B1 | 6/2018 | Gray | |
| 10,108,867 B1* | 10/2018 | Vallespi-Gonzalez | G01S 17/66 |
| 10,133,274 B2 | 11/2018 | Shashua et al. | |
| 10,134,278 B1 | 11/2018 | Konrardy et al. | |
| 10,157,331 B1 | 12/2018 | Tang et al. | |
| 10,262,213 B2 | 4/2019 | Chen et al. | |
| 10,282,995 B2 | 5/2019 | Heinla et al. | |
| 10,289,469 B2 | 5/2019 | Fortino et al. | |
| 10,372,136 B2 | 8/2019 | Yang et al. | |
| 10,380,886 B2 | 8/2019 | Ran et al. | |
| 10,489,972 B2 | 11/2019 | Atsmon | |
| 10,580,158 B1 | 3/2020 | Mousavian et al. | |
| 10,586,456 B2 | 3/2020 | Wang | |
| 10,599,546 B1 | 3/2020 | Walther et al. | |
| 10,625,748 B1 | 4/2020 | Dong et al. | |
| 10,635,110 B2 | 4/2020 | Shashua et al. | |
| 10,730,517 B2 | 8/2020 | Park et al. | |
| 10,739,778 B2 | 8/2020 | Winkler et al. | |
| 10,740,954 B2 | 8/2020 | Liu | |
| 10,761,535 B2 | 9/2020 | Chen et al. | |
| 10,776,985 B2 | 9/2020 | Liu et al. | |
| 10,816,978 B1 | 10/2020 | Schwalb | |
| 10,829,116 B2 | 11/2020 | Iagnemma et al. | |
| 10,829,793 B2 | 11/2020 | Arikawa et al. | |
| 10,832,439 B1 | 11/2020 | Ma et al. | |
| 10,885,698 B2 | 1/2021 | Muthler et al. | |
| 10,942,030 B2 | 3/2021 | Haque et al. | |
| 10,997,435 B2 | 5/2021 | Abbott et al. | |
| 11,042,163 B2 | 6/2021 | Chen et al. | |
| 11,079,764 B2 | 8/2021 | Nister et al. | |
| 11,321,924 B2 | 5/2022 | Molyneaux et al. | |
| 2004/0016870 A1 | 1/2004 | Pawlicki et al. | |
| 2004/0252864 A1 | 12/2004 | Chang et al. | |
| 2005/0196034 A1 | 9/2005 | Hattori et al. | |
| 2007/0154068 A1 | 7/2007 | Stein et al. | |
| 2007/0182528 A1 | 8/2007 | Breed et al. | |
| 2008/0266396 A1 | 10/2008 | Stein | |
| 2009/0088941 A1 | 4/2009 | Tsuchiya et al. | |
| 2009/0097704 A1 | 4/2009 | Savidge et al. | |
| 2009/0125177 A1 | 5/2009 | Tanaka et al. | |
| 2009/0256840 A1 | 10/2009 | Varadhan et al. | |
| 2010/0149193 A1 | 6/2010 | Yu | |
| 2010/0322476 A1 | 12/2010 | Kanhere et al. | |
| 2011/0044557 A1 | 2/2011 | Abraham et al. | |
| 2012/0194516 A1 | 8/2012 | Newcombe et al. | |
| 2013/0061033 A1 | 3/2013 | Kim et al. | |
| 2013/0100286 A1 | 4/2013 | Lao | |
| 2013/0106837 A1 | 5/2013 | Mukherjee et al. | |
| 2014/0104424 A1 | 4/2014 | Zhang et al. | |
| 2015/0054824 A1 | 2/2015 | Jiang | |
| 2015/0067672 A1 | 3/2015 | Mitra et al. | |
| 2015/0172626 A1 | 6/2015 | Martini | |
| 2015/0278578 A1 | 10/2015 | Otsuka et al. | |
| 2015/0304634 A1 | 10/2015 | Karvounis | |
| 2015/0346716 A1 | 12/2015 | Scharfe et al. | |
| 2016/0247290 A1 | 8/2016 | Liu et al. | |
| 2016/0321074 A1 | 11/2016 | Hung et al. | |
| 2016/0364907 A1 | 12/2016 | Schoenberg | |
| 2017/0010108 A1 | 1/2017 | Shashua | |
| 2017/0061625 A1 | 3/2017 | Estrada et al. | |
| 2017/0061632 A1 | 3/2017 | Lindner et al. | |
| 2017/0090478 A1 | 3/2017 | Blayvas et al. | |
| 2017/0116781 A1 | 4/2017 | Babahajiani et al. | |
| 2017/0124717 A1 | 5/2017 | Baruch et al. | |
| 2017/0124758 A1 | 5/2017 | Jia et al. | |
| 2017/0177950 A1 | 6/2017 | Hasberg | |
| 2017/0220876 A1* | 8/2017 | Gao | G06K 9/3241 |
| 2017/0236013 A1 | 8/2017 | Clayton et al. | |
| 2017/0259801 A1 | 9/2017 | Abou-Nasr et al. | |
| 2017/0344808 A1 | 11/2017 | El-Khamy et al. | |
| 2017/0357862 A1 | 12/2017 | Tatsubori | |
| 2017/0364083 A1 | 12/2017 | Yang et al. | |
| 2017/0371340 A1 | 12/2017 | Cohen et al. | |
| 2017/0371346 A1 | 12/2017 | Mei et al. | |
| 2018/0089833 A1 | 3/2018 | Lewis et al. | |
| 2018/0121273 A1 | 5/2018 | Fortino et al. | |
| 2018/0136332 A1 | 5/2018 | Barfield, Jr. et al. | |
| 2018/0158244 A1 | 6/2018 | Ybanez Zepeda et al. | |
| 2018/0164812 A1 | 6/2018 | Oh et al. | |
| 2018/0188059 A1 | 7/2018 | Wheeler et al. | |
| 2018/0203959 A1 | 7/2018 | Refsnaes et al. | |
| 2018/0232663 A1* | 8/2018 | Ross | G06N 3/105 |
| 2018/0267558 A1 | 9/2018 | Tiwari et al. | |
| 2018/0276278 A1 | 9/2018 | Cagan et al. | |
| 2018/0300590 A1 | 10/2018 | Briggs et al. | |
| 2018/0304468 A1 | 10/2018 | Holz | |
| 2018/0348374 A1 | 12/2018 | Laddha et al. | |
| 2018/0349746 A1 | 12/2018 | Vallespi-Gonzalez | |
| 2018/0370540 A1 | 12/2018 | Yousuf et al. | |
| 2018/0373980 A1* | 12/2018 | Huval | G06K 9/00805 |
| 2019/0016285 A1 | 1/2019 | Freienstein et al. | |
| 2019/0061771 A1 | 2/2019 | Bier et al. | |
| 2019/0065933 A1 | 2/2019 | Bogdoll et al. | |
| 2019/0066328 A1 | 2/2019 | Kwant et al. | |
| 2019/0071101 A1 | 3/2019 | Emura et al. | |
| 2019/0080467 A1 | 3/2019 | Hirzer et al. | |
| 2019/0101399 A1 | 4/2019 | Sunil Kumar et al. | |
| 2019/0102646 A1* | 4/2019 | Redmon | G06K 9/4652 |
| 2019/0102668 A1 | 4/2019 | Tao et al. | |
| 2019/0120640 A1 | 4/2019 | Ho et al. | |
| 2019/0129831 A1 | 5/2019 | Goldberg | |
| 2019/0146497 A1 | 5/2019 | Urtasan et al. | |
| 2019/0146500 A1 | 5/2019 | Yalla et al. | |
| 2019/0147600 A1 | 5/2019 | Karasev et al. | |
| 2019/0147610 A1 | 5/2019 | Frossard et al. | |
| 2019/0171912 A1 | 6/2019 | Vallespi-Gonzalez et al. | |
| 2019/0179979 A1 | 6/2019 | Melick | |
| 2019/0189001 A1 | 6/2019 | Smothers et al. | |
| 2019/0197774 A1 | 6/2019 | Molyneaux et al. | |
| 2019/0212749 A1 | 7/2019 | Chen et al. | |
| 2019/0213481 A1 | 7/2019 | Godard et al. | |
| 2019/0235515 A1 | 8/2019 | Shirvani et al. | |
| 2019/0243371 A1 | 8/2019 | Nister et al. | |
| 2019/0250622 A1 | 8/2019 | Nister et al. | |
| 2019/0251442 A1 | 8/2019 | Koivisto et al. | |
| 2019/0258251 A1 | 8/2019 | Ditty et al. | |
| 2019/0295282 A1 | 9/2019 | Smolyanskiy et al. | |
| 2019/0302761 A1 | 10/2019 | Huang et al. | |
| 2020/0013176 A1 | 1/2020 | Kang et al. | |
| 2020/0026960 A1 | 1/2020 | Park et al. | |
| 2020/0080849 A1 | 3/2020 | Ondruska et al. | |
| 2020/0117213 A1 | 4/2020 | Tian et al. | |
| 2020/0117898 A1 | 4/2020 | Tian et al. | |
| 2020/0143205 A1* | 5/2020 | Yao | G06K 9/6262 |
| 2020/0160559 A1 | 5/2020 | Urtasun et al. | |
| 2020/0175311 A1 | 6/2020 | Xu et al. | |
| 2020/0257306 A1 | 8/2020 | Nisenzon | |

(56) References Cited

U.S. PATENT DOCUMENTS

| | | |
|---|---|---|
| 2020/0293064 A1 | 9/2020 | Wu et al. |
| 2020/0293796 A1 | 9/2020 | Sajjadi Mohammadabadi et al. |
| 2020/0341466 A1 | 10/2020 | Pham et al. |
| 2020/0410254 A1 | 12/2020 | Pham et al. |
| 2021/0025696 A1 | 1/2021 | Goto et al. |
| 2021/0063198 A1 | 3/2021 | Nister et al. |
| 2021/0063199 A1 | 3/2021 | Akbarzadeh et al. |
| 2021/0064980 A1 | 3/2021 | Heinrich et al. |
| 2021/0089794 A1 | 3/2021 | Chen et al. |
| 2021/0150722 A1 | 5/2021 | Homayounfar et al. |
| 2021/0286923 A1 | 9/2021 | Kristensen et al. |
| 2021/0300379 A1 | 9/2021 | Hackeloeer et al. |
| 2022/0132145 A1 | 4/2022 | Choi et al. |

FOREIGN PATENT DOCUMENTS

| | | |
|---|---|---|
| DE | 10 2015 226 762 A1 | 6/2017 |
| EP | 1 930 863 A2 | 6/2008 |
| EP | 1 930 868 A1 | 6/2008 |
| EP | 2 384 009 A2 | 11/2011 |
| EP | 3 171 297 A1 | 5/2017 |
| EP | 3 441 909 A1 | 2/2019 |
| KR | 2012-0009590 A | 2/2012 |
| WO | 2012/011713 A2 | 1/2012 |
| WO | 2016/183074 A1 | 11/2016 |
| WO | 2017/177128 A1 | 10/2017 |
| WO | 2017/220705 A1 | 12/2017 |
| WO | 2018/002910 A1 | 1/2018 |
| WO | 2018/102717 A1 | 6/2018 |
| WO | 2018/104563 A2 | 6/2018 |
| WO | 2018/193254 A1 | 10/2018 |

OTHER PUBLICATIONS

Garnett et al., "Real-time category-based and general obstacle detection for autonomous driving", Oct. 22, 2017, IEEE International Conference on Computer Vision Workshops (ICCVW), p. 198-205 (Year: 2017).*

Christian Szegedy, Wei Liu, Yangqing Jia, Pierre Sermanet, Scott Reed, Dragomir Anguelov, Dumitru Erhan, Vincent Vanhoucke, Andrew Rabinovich, "Going Deeper with Convolutions", https://arxiv.org/abs/1409.4842.

Jonathan Long, Evan Shelhamer, and Trevor Darrell, "Fully convolutional networks for semantic segmentation", CVPR, Nov. 2015.

Jose M. Alvarez, Theo Gevers, Yann LeCun, and Antonio M. Lopez, "Road scene segmentation from a single image", in Proceedings of the 12th European Conference on Computer Vision—vol. Part VII, ECCV'12, pp. 376-389, Berlin, Heidelberg, 2012.

Clemens-Alexander Brust, Sven Sickert, Marcel Simon, Erik Rodner, and Joachim Denzler "Convolutional patch networks with spatial prior for road detection and urban scene understanding", In International Conference on Computer Vision Theory and Applications (VISAPP), 2015.

Rahul Mohan, "Deep deconvolutional networks for scene parsing", CoRR, abs/1411.4101, 2014.

Gabriel L. Oliveira, Wolfram Burgard, Thomas Brox. Efficient Deep Models for Monocular Road Segmentation IEEE/RSJ International Conference on Intelligent Robots and Systems (IROS 2016).

Marvin Teichmann, Michael Weber, Marius Zoellner, Roberto Cipolla, and Raquel Urtasun. Multinet: Real-time joint semantic reasoning for autonomous driving. arXiv preprint arXiv:1612.07695, 2016.

Q. Wang, J. Gao and Y. Yuan, Embedding Structured Contour and Location Prior in Siamesed Fully Convolutional Networks for Road Detection, in IEEE Transactions on Intelligent Transportation Systems, vol. 19, No. 1, pp. 230-241, Jan. 2018.

C C. T. Mendes V Fremont D. F. Wolf Exploiting fully convolutional neural networks for fast road detection, Proc. IEEE Int. Conf. Robot. Auto. (ICRA), pp. 3174-3179 May 2016.

"Neural Networks", https://www.tensorflow.org/api_guides/python/nn#conv2d_transpose.

Song Han, Jeff Pool, John Tran, William J. Dally, "Learning both Weights and Connections for Efficient Neural Networks", https://arxiv.org/abs/1506.02626.

Pavlo Molchanov, Stephen Tyree, Tero Karras, Timo Aila, Jan Kautz, "Pruning Convolutional Neural Networks for Resource Efficient Inference", https://arxiv.org/abs/1611.06440.

A. Elfes. Sonar-based real-world mapping and navigation. Journal of Robotics and Automation, 1987.

S. Thrun, W. Burgard, and D. Fox. Probabilistic Robotics: Intelligent Robotics and Autonomous Agents. The MIT Press, 2005.

H. Badino, U. Franke, and R. Mester. Free space computation using stochastic occupancy grids and dynamic programming. In ICCV Workshop on Dynamical Vision, 2007.

U. Franke and I. Kutzbach. Fast stereo based object detection for stop and go traffic. In IV, 1996.

H. Badino, U. Franke, and D. Pfeiffer. The stixel world—a compact medium level representation of the 3d-worid. in DAGM, 2009.

H. Hirschmuller. Stereo processing by semiglobal matching and mutual information. PAMI, 2008.

R. Benenson, R. Timofte, and L. Gool. Stixels estimation without depth map computation. In ICCV, 2011.

J. Yao, S. Ramalingam, Y. Taguchi, Y. Miki, and R. Urtasun, "Estimating drivable collision-free space from monocular video," in Applications of Computer Vision, 2015, pp. 420-427.

D. Levi N. Garnett E. Fetaya "Stixelnet: A deep convolutional network for obstacle detection and road segmentation", 26th British Machine Vision Conference (BMVC) 2015.

K. He, X. Zhang, S. Ren, J. Sun, "Deep residual learning for image recognition", Proc. IEEE Conf. Comput. Vis. Pattern Recognit (CVPR), 2016.

"Systems and Methods for Safe and Reliable Autonomous Vehicles", U.S. Appl. No. 62/584,549, filed Nov. 10, 2017.

"System and Method for Safe Operation of Autonomous Vehicles", U.S. Appl. No. 62/625,351, filed Feb. 2, 2018.

"Conservative Control for Zone Driving of Autonomous Vehicles", U.S. Appl. No. 62/628,831, filed Feb. 9, 2018.

"Systems and Methods for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for autonomous vehicles", U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Methods for Accurate Real-time Lane and Road Boundary Detection for Autonomous Driving", U.S. Appl. No. 62/636,142, filed Feb. 27, 2018.

Garnett, Noa et al.: "Real-Time Category-Based and General Obstacle Detection for Autonomous Driving", 2017 IEEE International Conference on Computer Vision Workshops (ICCVW), IEEE, Oct. 22, 2017 (Oct. 22, 2017), pp. 198-205, XP033303458.

International Search Report and Written Opinion dated Aug. 26, 2019 in International Patent Application No. PCT/US2019/022592, 18 pages.

Asvadi, A., et al.,"DepthCN: Vehicle detection using 3D-LIDAR and ConvNet", IEEE 20th International Conference on Intelligent Transportation Systems (ITSC), pp. 1-6 (2017).

Bidlack, C. et al., "Visual Robot Navigation Using Flat Earth Obstacle Projection", Proceedings of the IEEE International Conference on Robotics and Automation, pp. 3374-3381 (May 8, 1994).

He, L., et al., "Learning Depth from Single Images with Deep Neural Network Embedding Focal Length", Cornell University Library, pp. 1-14 (Mar. 27, 2018).

Jayaraman, A., et al., "Creating 3D Virtual Driving Environments for Simulation-Aided Development of Autonomous Driving and Active Safety", SAE Technical Paper Series, vol. 1, pp. 1-3 (Mar. 28, 2017) (English Abstract Submitted).

Kim, W.S., et al.,"Depth map coding with distortion estimation of rendered view", Proceedings of SPIE, vol. 7543, p. 75430B (Jan. 17, 2010).

(56) References Cited

OTHER PUBLICATIONS

Liu, H., et al., "Neural Person Search Machines", IEEE International Conference on Computer Vision (ICCV), pp. 493-501 (2017).

Neven, D. et al., "Towards End-to-End Lane Detection: an Instance Segmentation Approach", Retrieved from the ntemet: URL:https://arxiv.org/pdf/1802.05591.pdf, Retrieved on May 21, 2020, pp. 1-7 (2018).

Stein, G. P., et al., "Vision-Based ACC With A Single Camera: Bounds on Range and Range Rate Accuracy", Proceedings of IEEE Intelligent Vehicle Symposium, pp. 1-6 (2003).

Suorsa, R. E., et al., "A Parallel Implementation of a Multisensor Feature-Based Range-Estimation Method", IEEE Transactions on Robotics and Automation, vol. 10, Issue 6, pp. 755-768 (1994) (English Abstract Submitted).

Tateno, K. et al., "CNN-SLAM: Real-time dense monocular SLAM with learned depth prediction", Cornell University Library, pp. 6243-6252, (2017).

International Search Report and Written Opinion received for PCT Patent Application No. PCT/US2019/068764, dated Apr. 22, 2020, 15 pages.

International Search Report and Written Opinion received for PCT Patent Application No. PCT/US2019/068766, dated Apr. 22, 2020, 13 pages.

International Preliminary Report on Patentability received for PCT Application No. PCT/US2019/018348, dated Aug. 27, 2020, 16 pages.

International Preliminary Report on Patentability received for PCT Application No. PCT/US2019/019656, dated Sep. 3, 2020, 11 pages.

International Preliminary Report on Patentability received for PCT Application No. PCT/US2019/022592, dated Sep. 24, 2020, 11 pages.

International Preliminary Report on Patentability received for PCT Application No. PCT/US2019/024400, dated Oct. 8, 2020, 10 pages.

Non-Final Office Action dated Oct. 21, 2020 in U.S. Appl. No. 16/277,895, 13 pages.

Notice of Allowance dated Jan. 19, 2021 in U.S. Appl. No. 16/286,329, 8 pages.

International Preliminary Report on Patentability received for PCT Application No. PCT/US2019/068766, dated Jul. 8, 2021, 10 pages.

International Preliminary Report on Patentability received for PCT Application No. PCT/US2019/068764, dated Jul. 8, 2021, 12 pages.

Notice of Allowance dated Jul. 16, 2021, in U.S. Appl. No. 16/728,598, 09 pages.

Notice of Allowance dated Aug. 19, 2021, in U.S. Appl. No. 16/277,895, 10 pages.

Notice of Allowance dated Aug. 31, 2021, in U.S. Appl. No. 16/728,595, 08 pages.

Non-Final Office Action dated Oct. 7, 2021, in U.S. Appl. No. 16/366,875, 22 pages.

Notice of Allowance dated Oct. 7, 2021, in U.S. Appl. No. 16/813,306, 09 pages.

Final Office Action dated Apr. 15, 2021 in U.S. Appl. No. 16/277,895, 20 pages.

Non-Final Office Action dated May 13, 2021 in U.S. Appl. No. 16/728,595, 18 pages.

Notice of Allowance dated Jul. 2, 2021 in U.S. Appl. No. 16/813,306, 13 pages.

"ISO 26262", Wikipedia, Retrieved from Internet URL: https://en.wikipedia.org/wiki/ISO_26262#:~:text=ASIL%20classifications%20are%20used%20within,and%20ASIL%20A%20the%20lowest, accessed on Jan. 28, 2022, pp. 8.

Du, L., and Du, Y., "Hardware Accelerator Design for Machine Learning," Machine Learning—Advanced Techniques and Emerging Applications, Retrieved from Internet URL : https://www.intechopen.com/chapters/58659, pp. 1-14 (2017).

Notice of Allowance dated Dec. 14, 2021 in U.S. Appl. No. 16/728,595, 8 pages.

Final Office Action dated Dec. 29, 2021 in U.S. Appl. No. 16/186,473, 22 pages.

Final Office Action dated Feb. 8, 2022 in U.S. Appl. No. 16/366,875, 20 pages.

"Adaptive Occlusion Sampling of Rectangular Area Lights with Voxel Cone Tracing", U.S. Appl. No. 62/644,806, filed Mar. 19, 2018.

"Distance Based Ambient Occlusion Filler for Denoising Ambient Occlusions", U.S. Appl. No. 62/644,601, filed Mar. 19, 2018.

"Convolutional Neural Networks to Detect Drivable Freespace for Autonomous Vehicles", U.S. Appl. No. 62/643,665, filed Mar. 15, 2018.

"Energy Based Reflection Filler for Denoising Ray-Traced Glossy Reflections", U.S. Appl. No. 62/644,386, filed Mar. 17, 2018.

"Geometric Shadow Filler for Denoising Ray-Traced Shadows", U.S. Appl. No. 62/644,385, filed Mar. 17, 2018.

"Deep Neural Network for Estimating Depth from Stereo Using Semi-Supervised Learning", U.S. Appl. No. 62/646,148, filed Mar. 21, 2018.

"Video Prediction Using Spatially Displaced Convolution", U.S. Appl. No. 62/646,309, filed Mar. 21, 2018.

"Video Prediction Using Spatially Displaced Convolution", U.S. Appl. No. 62/647,545, filed Mar. 23, 2018.

"Network Injection Rate Limiting", U.S. Appl. No. 62/648,326, filed Mar. 26, 2018.

"System and Methods for Advanced AI-Assisted Vehicles", U.S. Appl. No. 62/648,358, filed Mar. 26, 2018.

"Network Synchronization Using Posted Operation Tracking For Flush Semantics", U.S. Appl. No. 62/648,333, filed Mar. 26, 2018.

"Euler spiral", Wikipedia, Retrieved from Internet URL : https://en.wikipedia.org/wiki/Euler_spiral, accessed on Feb. 21, 2019, p. 10.

"F1 score", Wikipedia, Retrieved from Internet URL : https://en.wikipedia.org/wiki/F1_score, accessed on Feb. 21, 2019, p. 3.

"Polynomial curve fitting", Retrieved from Internet URL : https://www.mathworks.com/help/matlab/ref/polyfit.html, accessed on Feb. 21, 2019, p. 13.

"Taxonomy and Definitions for Terms Related to Driving Automation Systems for On-Road Motor Vehicles", National Highway Traffic Safety Administration (NHTSA), A Division of the U.S. Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the U.S. Department of Transportation, and the Society of Automotive Engineers (SAE), Standard No. J3016-201806, pp. 1-35 (Jun. 15, 2018).

"What is polyline?", Webopedia Definition, Retrieved from Internet URL : https://www.webopedia.com/TERM/P/polyline.html, accessed on Feb. 21, 2019, p. 4.

"What are deconvolutional layers?", Data Science Stack Exchange, Retrieved from Internet URL : https://datascience.stackexchange.com/questions/6107/what%E2%80%90are%E2%80%90deconvolutional%E2%80%90layers, accessed on Feb. 21, 2019, p. 21.

Bach, M., et al., "Multi-Camera Traffic Light Recognition Using A Classifying Labelled Multi-Bernoulli Filter", In 2017 IEEE Intelligent Vehicles Symposium (IV), pp. 1045-1051 (Jun. 2017).

Bojarski, M., et al.,"End To End Learning For Self-Driving Cars", arXiv: 1604.07316v1 [cs.CV], pp. 1-9 (Apr. 25, 2016).

Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, p. 16 (Jul. 5, 2017).

Deshpande, A., "A Beginner's Guide to Understanding Convolutional Neural Networks", Retrieved from Internet URL: https://adeshpande3.github.io/A-Beginner%27s-Guide-To-Understanding-Convolutional-Neural-Networks/, accessed on Feb. 21, 2019, p. 13.

(56) References Cited

OTHER PUBLICATIONS

Dipietro, R., "A Friendly Introduction to Cross-Entropy Loss," Version 0.1, Retrived from Internet URL : https://rdipietro.github.io/friendly-intro-to-cross-entropy-loss/, accessed on Feb. 21, 2019, p. 10 (May 2, 2016).
Foley, D., and Danskin, J., "Ultra-Performance Pascal GPU and NVLink Interconnect," IEEE Computer Society, IEEE Micro, vol. 37, No. 2, pp. 1-11 (2017).
Godard, C., et al. ,"Unsupervised Monocular Depth Estimation with Left-Right Consistency", IEEE Computer Society Conference on Computer Vision and Pattern Recognition, pp. 270-279 (Jul. 21, 2017).
Huval, B., et al., "An Empirical Evaluation of Deep Learning on Highway Driving", arXiv:1504.01716v3, p. 7 (Apr. 17, 2015).
Ioffe, S., and Szegedy, C., "Batch Normalization: Accelerating Deep Network Training by Reducing Internal Covariate Shift", arXiv: 1502.03167v3, pp. 1-12 (Mar. 2, 2015).
Kendall, A., et al.,"End-to-end Learning of Geometry and Context for Deep Stereo Regression", pp. 66-75 (Mar. 13, 2017).
Kingma, D. P., and BA, J. L., "Adam: A Method for Stochastic Optimization", Published as a conference paper at ICLR 2015, arXiv:1412.6980v9, pp. 1-15 (Jan. 30, 2017).
Pang, J., et al., "Cascade Residual Learning: A Two-Stage Convolutional Neural Network for Stereo Matching", IEEE International Conference on Computer Vision Workshops, pp. 887-895 (Oct. 22, 2017).
Rothe, R., et al., "Non-Maximum Suppression For Object Detection By Passing Messages Between Windows", In Asian Conference On Computer Vision, pp. 1-17 (2015).
Tao, A., et al.,"Detectnet Deep Neural Network For Object Detection In Digits", Retrieved from Internet URL https://devblogs.nvidia.com/detectnet-deep-neural-network-object-detection-digits/, accessed on Jul. 22, 2019, p. 9.
Virgo, M., "Lane Detection with Deep Learning (Part 1)", Retrieved from Internet URL : https://towardsdatascience.com/lane-delection-with-deep-learning-part-1-9e096f3320b7, accessed on Feb. 22, 2019, p. 10 (May 9, 2017).
Weber, M., et al., "DeepTLR: A Single Deep Convolutional Network For Detection And Classification Of Traffic Lights", In IEEE Intelligent Vehicles Symposium (IV), pp. 1-7 (Jun. 2016).
Xie, S., and Tu, Z., "Holistically-Nested Edge Detection", Computer Vision Foundation, pp. 1395-1403 (2015).
Zhong, Y., et al., "Self-Supervised Learning for Stereo Matching With Self-Improving Ability", arXiv:1709.00930v1, pp. 1-13 (Sep. 4, 2017).
Invitation to pay additional fees received for PCT Application No. PCT/US2019/018348, dated May 29, 2019, 18 pages.
Invitation to pay additional fees received for PCT Application No. PCT/US2019/019656, dated May 31, 2019, 9 pages.
Invitation to pay additional fees received for PCT Application No. PCT/US2019/022592, dated Jun. 26, 2019, 9 pages.
International Search Report and Written Opinion dated Jun. 26, 2019 in International Application No. PCT/US2019/024400, 11 pages.
International Search Report and Written Opinion received for PCT Patent Application No. PCT/US2019/019656, dated Jul. 24, 2019, 15 pages.
International Search Report and Written Opinion received for PCT Patent Application No. PCT/US2019/018348, dated Jul. 25, 2019, 22 pages.
Non-Final Office action dated Jun. 24, 2020 in U.S. Appl. No. 16/286,329, 18 pages.
Corrected Notice of Allowability dated Apr. 8, 2021 in U.S. Appl. No. 16/286,329, 2 pages.
Non-Final Office Action dated May 17, 2021 in U.S. Appl. No. 16/186,473, 13 pages.
Supplemental Notice of Allowability dated Jul. 29, 2021 in U.S. Appl. No. 16/728,598, 2 pages.
Supplemental Notice of Allowability dated Sep. 27, 2021 in U.S. Appl. No. 16/728,598, 2 pages.
Supplemental Notice of Allowability dated Oct. 22, 2021 in U.S. Appl. No. 16/728,598, 2 pages.
Corrected Notice of Al lowability dated Nov. 1, 2021, in U.S. Appl. No. 16/277,895, 2 pages.
Notice of Allowability dated Oct. 25, 2021 in U.S. Appl. No. 16/728,595, 2 pages.
Notice of Allowability dated Jan. 27, 2022 in U.S. Appl. No. 16/728,595, 2 pages.
Liang, Z., et al., "Learning for Disparity Estimation through Feature Constancy", Computer Vision and Pattern Recognition, pp. 2811-2820 (2018).
Liu, F., et al., "Learning Depth from Single Monocular Images Using Deep Convolutional Neural Fields", IEEE Transactions on Pattern Analysis and Machine Intelligence, pp. 1-16 (2015).
Mayer, N., et al., "A Large Dataset to Train Convolutional Networks for Disparity, Optical Flow, and Scene Flow Estimation", IEEE Conference on Computer Vision and Pattern Recognition, pp. 1-14 (2016).
Mikic, I. et al., "Human Body Model Acquisition and Tracking Using Voxel Data", International Journal of Computer Vision, vol. 53, No. 3, pp. 199-223 (2003).
Park, J_ J., et al., "DeepSDF: Learning Continuous Signed Distance Functions for Shape Representation", Proceedings of the IEEE/CVF Conference on Computer Vision and Pattern Recognition (CVPR), pp. 165-174 (2019).
Palmisano, S., et al., "Stereoscopic perception of real depths at large distances", Journal of Vision, vol. 10, No. 6, pp. 1-16 (Jun. 2010).
Rauch, S., et al., "Autonomes Fahren auf der Autobahn—Eine Potentialstudie fur zukunflige rahrerassistenzsysteme", XP055715893, Munchen, pp. 1-13, (Dec. 31, 2012), Retrieved from the Internet:URL:https://mediatum.ub.tum.de/doc/1142101/1142101.Pdf [retrieved on Jul. 17, 2020].
Seki, A., and Pollefeys, M., "Patch Based Confidence Prediction for Dense Disparity Map", British Machine Vision conference, pp. 1-13 (2016).
Seki, A., and Pollefeys, M., "SGM-Nets: Semi-Global Matching with Neural Networks", IEEE Conference on computerVision and Pattern Recognition, pp. 231-240 (2017).
Shaked, A., and Wolf, L., "Improved Stereo Matching With Constant Highway Networks and Reflective Confidence learning", IEEE Conference on Computer Vision and Pattern Recognition, pp. 1-13 (2016).
Sergey, I., et al., "Batch Normalization: Accelerating Deep Network Training by Reducing Internal Covariate Shill", pp. 1-11 (Mar. 2, 2015) Available at: https://arxiv.org/abs/1502.03167.
Wang, Z., "Image quality assessment: from error visibility to structural similarity", IEEE Transactions on Image Processing, vol. 13, No. 4, pp. 1-14, (Apr. 2004).
Wu, J., et al., "Automatic background filtering and lane identification with roadside LiDAR data", 2017 IEEE 20th International Conference on Intelligent Transportation Systems (ITSC), pp. 1-6 (2017).
Yang, Z., "Research on Lane Recognition Algorithm Based on Deep Learning", International Conference on Artificial Intelligence and Advanced Manufacturing (AIAM), IEEE, pp. 387-391 (2019).
Zbontar, J., and Lecun, Y., "Stereo Matching by Training a Convolutional Neural Network to Compare Image Patches", Journal of Machine Learning Research, vol. 17, pp. 1-32 (2016).
Zhao, H., et al., "Loss Functions for Image Restoration With Neural Networks", IEEE Transactions on Computational imaging, vol. 3, No. 1, pp. 1-11 (Mar. 2017).
International Search Report and Written Opinion dated Oct. 17, 2019 in International Patent Application No. PCT/US2019/012535, 24 pages.
International Search Report and Written Opinion dated Oct. 18, 2019 in International Patent Application No. PCT/US2019/042225, 11 pages.
International Search Report and Written Opinion dated Nov. 7, 2019 in International Patent Application No. PCT/US2019/022753, 18 Pages.
International Search Report and Written Opinion dated Apr. 15, 2020 in Application No. PCT/US2019/061820 filed Nov. 15, 2019.

(56) References Cited

OTHER PUBLICATIONS

International Preliminary Report on Patentability International Patent Application No. PCT/US2019/012535 dated Jul. 16, 2020, 16 pages.
Invitation to pay additional fees received for PCT Application No. PCT/US2020/028116, dated Jul. 21, 2020, 12 pages.
International Search Report and Written Opinion in International Patent Application No. PCT /US2020/021894 dated Aug. 3, 2020, 14 pages.
International Preliminary Report on Patentability received for PCT Application No. PCT/US2019/016418, dated Aug. 13, 2020, 8 pages.
International Search Report and Written Opinion received for PCT Patent Application No. PCT/US2020/028116, dated Sep. 11, 2020, 17 pages.
International Preliminary Report on Patentability received for PCT Application No. PCT/US2019/022753, dated Oct. 1, 2020, 14 pages.
International Search Report and Written Opinion received for PCT Patent Application No. PCT/US2020/039430, dated Oct. 9, 2020, 13 pages.
International Search Report and Written Opinion received for PCT Patent Application No. PCT/US2020/048786, dated Nov. 12, 2020, 13 pages.
International Preliminary Report on Patentability received for PCT Patent Application No. PCT/US2019/042225, dated Jan. 28, 2021, 9 pages.
International Search Report and Written Opinion received for PCT Patent Application No. PCT/US2020/062869, dated Mar. 17, 2021, 11 pages.
International Preliminary Report on Patentability received for PCT Application No. PCT/US2019/061820, dated May 27, 2021, 9 pages.
International Preliminary Report on Patentability received for PCT Application No. PCT /US2020/021894, dated Sep. 23, 2021, 11 pages.
International Preliminary Report on Patentability received for PCT Application No. PCT/US2020/028116, dated Nov. 4, 2021, 14 pages.
International Preliminary Report on Patentability received for PCT Application No. PCT/US2020/039430, dated Jan. 6, 2022, 12 pages.
International Preliminary Report on Patentability received for PCT Application No. PCT/US2020/048786, dated Mar. 10, 2022, 11 pages.
"Programmable Vision Accelerator", U.S. Appl. No. 62/156,167, filed May 1, 2015.
"Methodology of Using a Single Controller (ECU) For a Fault-Tolerant/Fail-Operational Self-Driving System", U.S. Appl. No. 62/524,283, filed Jun. 23, 2017.
"System and Method for Controlling Autonomous Vehicles", U.S. Appl. No. 62/614,466, filed Jan. 7, 2018.
"Detection of Hazardous Autonomous Driving Using Machine Learning", U.S. Appl. No. 62/622,538, filed Jan. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection In Autonomous Driving Applications", U.S. Appl. No. 62/699,669, filed Jul. 17, 2018.
"Distance to Obstacle Detection in Autonomous Driving Applications", U.S. Appl. No. 62/786,188, filed Dec. 28, 2018.
"Detection and Classification of Wait Conditions in Autonomous Driving Applications", U.S. Appl. No. 62/816,838, filed Mar. 11, 2019.
"Intersection Detection and Handling Using Live Perception in Autonomous Driving Applications", U.S. Appl. No. 62/839,155, filed Apr. 26, 2019.
Map Health Monitoring For Autonomous Machine Applications, U.S. Appl. No. 63/177,813, filed Apr. 21, 2021.
"Intersection Contention Area Detection Using Live Perception in Autonomous Driving Applications", U.S. Appl. No. 62/866,158, filed Jun. 25, 2019.
"Lidar range Image Processing for Autonomous Vehicle Applications", U.S. Appl. No. 62/893,814, filed Aug. 30, 2019.
"Implementation of Control Flow in TensorFlow" TensorFlow Authors, Retrieved from the Internet URL : http://lownload.tensorflow.org/paper/white_paper_If_control_flow_implementation_2017 11_1.pdf, pp. 1-18 (Nov. 1, 2016).
"tensorflow", Retrieved from the Internet URL https://github.com/lensorflow/lensorflow/blob/master/lensorflow/core/kernels/hinge-loss.h, accessed on May 16, 2019, pp. 1-4.
"tf.whileloop much slower than static graph? #9527", tensorflow, Retrieved from the Internet URL: https://github.com/tensorflow/lensorflow/issues/9527,accessed on May 16, 2019, pp. 1-7.
"tf.losses.get_regularization_loss", TensorFlow Core 1.13, Retrieved from the Internet URL: https://www.tensorflow.org/api_docs/python/lf/losses/get_regularization_loss, accessed on May 16, 2019, pp. 1-1.
Allison, R. S., et al., "Binocular depth discrimination and estimation beyond interaction space", Journal of Vision, vol. 9, No. 1, pp. 1-14 (Jan. 2009).
Borland, D., and Taylor II, R. M.," Rainbow Color Map {Still) Considered Harmful", IEEE Computer Graphics and Applications, vol. 27, No. 2, pp. 1-17 (Mar./Apr. 2007).
Chen, J., et al., "FOAD: Fast Optimization-based Autonomous Driving Motion Planner", 2018 Annual American contro Conference {ACC), IEEE, pp. 1-8 (Jun. 27-29, 2018).
Cheng, G., et al., "Automatic Road Detection and Centerline Extraction via Cascaded End-lo-End Convolutional Neural Network", IEEE Transactions on Geoscience and Remote Sensing vol. 55, No. 6, pp. 3322-3337 (Jun. 1, 2017).
Clevert, D., A., et al.,"Fast and Accurate Deep Network Learning by Exponential Linear Units (ELUs)", ICLR 2016, pp. 1-14 (Feb. 22, 2016).
Cormack, R.H., "Stereoscopic depth perception at far viewing distances", Perception & Psychophysics, vol. 35, No. 5, pp. 423-428 (Sep. 1984).
Eigen,D., et al., "Depth Map Prediction from a Single Image using a Multi-Scale Deep Network", NIPS, pp. 1-9, (2014).
Fukunaga, K., and Hostetler, L., "The estimation of the gradient of a density function, with applications in patten recognition", IEEE Transactions on Information Theory, vol. 21, No. 1, pp. 32-40 (Jan. 1975).
Garg, R., et al., "Unsupervised CNN for Single View Depth Estimation: Geometry to the Rescue", ECCV 2016, pp. 1-16 (Jul. 29, 2016).
Geiger, A., et al., "Vision meets Robotics: The KITTI Dataset", The International Journal of Robotics Research, pp. 1-6 (2013).
Gidaris, S., and Komodakis, N., "Detect, Replace, Refine: Deep Structured Prediction For Pixel Wise Labeling", computerVision and Pattern Recognition, pp. 1-21 (Dec. 14, 2016).
Gregory, R. L., "Eye and brain: The psychology of seeing", World University Library, p. 130 (1966) (Part 1).
Gregory, R. L., "Eye and brain: The psychology of seeing", World University Library, p. 130 (1966) (Part 2).
Guney, F., et al., Displets: Resolving Stereo Ambiguities using Object Knowledge:, IEEE Conference on Computer Vision and Pattern Recognition (CVPR), pp. 1-11 (Jun. 7-12, 2015).
Hartley, R., and Zisserman, A., "Multiple View Geometry in Computer Vision", Cambridge University Press, pp. 1-48 (2004).
Hibbard, P. B., et al., "Magnitude, precision, and realism of depth perception in stereoscopic vision", Cognitive Research: Principles and Implications, vol. 2, pp. 1-11 (2017).

(56) References Cited

OTHER PUBLICATIONS

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

Jaderberg, M., et al., "Spatial Transformer Networks", NIPS, pp. 1-9 (2015).

John, V., et al., "Real-time road surface and semantic lane estimation using deep features", Signal, Image and Video Processing, vol. 12, pp. 1133-1140 (Mar. 8, 2018).

Kokkinos, I., "Pushing the Boundaries of Boundary Detection using Deep Learning", Retrieved from the Internet URL:http://arxiv.org/pdf/1511.07386v2.pdf, pp. 1-12 (2016).

Kovesi, P., "Good Colour Maps: How to Design Them" arXiv: 1509.03700, pp. 1-42 (Sep. 12, 2015).

Kunze, L., et al., "Reading between the Lanes: Road Layout Reconstruction from Partially Segmented Scenes", 2018 21st International Conference on Intelligent Transportation Systems (ITSC), pp. 401-408 (Nov. 4-7, 2018).

Kutulakos, K. N., and Seitz, S. M., "A Theory of Shape by Space Carving" International Journal of Computer Vision, vol. 38, No. 3, pp. 199-218 (2000).

Kuznietsov, Y., et al., "Semi-Supervised Deep Learning for Monocular Depth Map Prediction", Computer Vision anc Pattern Recognition, pp. 6647-6655 (2017).

Laurentini, A., "How far 3D shapes can be understood from 2D silhouettes", IEEE Transactions on Pattern Analysis and Machine Intelligence, vol. 17, No. 2, pp. 188-195 (Feb. 1995).

Levin, C. A., and Haber, R. N., "Visual angle as a determinant of perceived interobject distance" Perception & Psychophysics vol. vol. 54, No. 2, pp. 250-259 (Mar. 1993).

International Search Report and Written Opinion of the International Search Authority dated Apr. 26, 2019, issued in International Application No. PCT/US2018/060205, 13 pages.

European communication issued in Application No. 18816312.5 dated Nov. 11, 2021 (5 pages).

* cited by examiner

DETERMINING DRIVABLE FREE-SPACE FOR AUTONOMOUS VEHICLES

CROSS-REFERENCE TO RELATED APPLICATIONS

This application claims the benefit of U.S. Provisional Application No. 62/643,665, filed on Mar. 15, 2018, which is hereby incorporated by reference in its entirety.

This application is related to U.S. Non-provisional application Ser. No. 16/286,329, filed on Feb. 26, 2019, U.S. Non-provisional application Ser. No. 16/277,895, filed on Feb. 15, 2019, and U.S. Non-provisional application Ser. No. 16/186,473, filed on Nov. 9, 2018, each of which is hereby incorporated by reference in its entirety.

BACKGROUND

An autonomous driving system should control an autonomous vehicle without human supervision while achieving an acceptable level of safety. This may require the autonomous driving system to be capable of achieving at least the functional performance of an attentive human driver, who draws upon a perception and action system that has an incredible ability to identify and react to moving and static obstacles in a complex environment. In order to accomplish this, areas of the environment that are obstacle-free (e.g., drivable free-space) may be determined, as this information may be useful to the autonomous driving system and/or advanced driver assistance systems (ADAS) when planning maneuvers and/or navigation decisions.

Some conventional approaches to determining drivable free-space have used vision-based techniques using deep artificial neural networks (DNN). For example, these conventional approaches have used a DNN, such as a convolutional neural network (CNN), to perform semantic segmentation (e.g., pixel-wise classification of an image). However, semantic segmentation may be computationally expensive because a classification is assigned to each pixel of an image and, as a result, may require extensive post-processing on outputs of the DNN to make the outputs useable by the autonomous driving system. Thus, a drawback of many conventional approaches that use semantic segmentation for determining drivable free-space is their inability to run in real-time. In some conventional approaches—such as where adjustments are made to reduce the computational expense to allow real-time operation—semantic segmentation comes at the expense of determining the drivable free-space below a level of accuracy required to maintain an acceptable level of safety for autonomous driving.

In addition, in other conventional approaches, a CNN may be implemented that may perform column-wise regression. However, these conventional approaches may use fully connected layers which, similar to the semantic segmentation tasks described above, also may consume an excessive amount of computing resources, thereby reducing the ability of the CNNs to run in real-time. In addition, even where CNNs are used to perform column-wise regression, the type or class of boundary or barrier regressed upon in each column is not identified. As a result, the output of the CNNs may not be informative enough to an autonomous driving system to enable safe operation of an autonomous vehicle. For example, without context provided by the CNN of a class of boundary—e.g., a dynamic boundary, such as a human, as opposed to a static boundary, such as a curb—the autonomous driving system may not be able to accurately predict drivable free-space in a way that results in safe control of the autonomous vehicle. In such an example, when determining where to navigate, the autonomous driving system may not take into account the dynamic nature of the boundary (e.g., a dynamic boundary class may decrease the drivable free-space upon movement). As a result, the autonomous vehicle may use the determined drivable free-space for navigating the environment even where the determined drivable free-space does not correspond to the actual drivable free-space (e.g., as a result of movement of one or more dynamic boundary classes).

SUMMARY

Embodiments of the present disclosure relate to determining drivable free-space for autonomous vehicles. More specifically, systems and methods are disclosed for identifying one or more boundaries separating drivable free-space (e.g., obstacle free-space) from non-drivable space (e.g., space with or beyond one or more obstacles) in a physical environment for use by an autonomous vehicle in navigating the physical environment.

In contrast to conventional systems, such as those described above, systems of the present disclosure may use an efficient and accurate machine learning model—such as a convolutional neural network (CNN)—to regress on one or more boundaries separating drivable free-space from non-drivable space in a physical environment. For example, the CNN of present systems may be a fully convolutional network, meaning the CNN may not include any fully-connected layers, thereby increasing the efficiency of the systems while reducing the drain on computing resources. In addition, by regressing on the boundary(ies) (e.g., column by column), the current systems may not require separately classifying each pixel of an image—as required by conventional segmentation approaches—thereby reducing the requirement of performing extensive post-processing on the output of the CNN.

In further contrast to conventional approaches, the CNN of the present systems may predict labels for each of the boundary classes corresponding to the boundary(ies) identified in the image. As a result, the present systems may use this contextual information (e.g., dynamic boundary, static boundary, vehicle, pedestrian, curb, barrier, etc.) to navigate an autonomous vehicle through the environment safely, taking into consideration the different boundary classes delineating the drivable free-space—such as whether the boundary classes may move, how they may move, where they move to, and/or the like.

Ultimately, the present systems may implement a CNN for detecting drivable free-space that—compared to conventional approaches—is computationally less expensive, more contextually informative, efficient enough to run in real-time (e.g., at 30 frames per second or greater), and accurate enough for use in navigating an autonomous vehicle through a real-world physical environment safely.

BRIEF DESCRIPTION OF THE DRAWINGS

The present systems and methods for determining drivable free-space for autonomous vehicles is described in detail below with reference to the attached drawing figures, wherein.

DETAILED DESCRIPTION

Figure 1A:
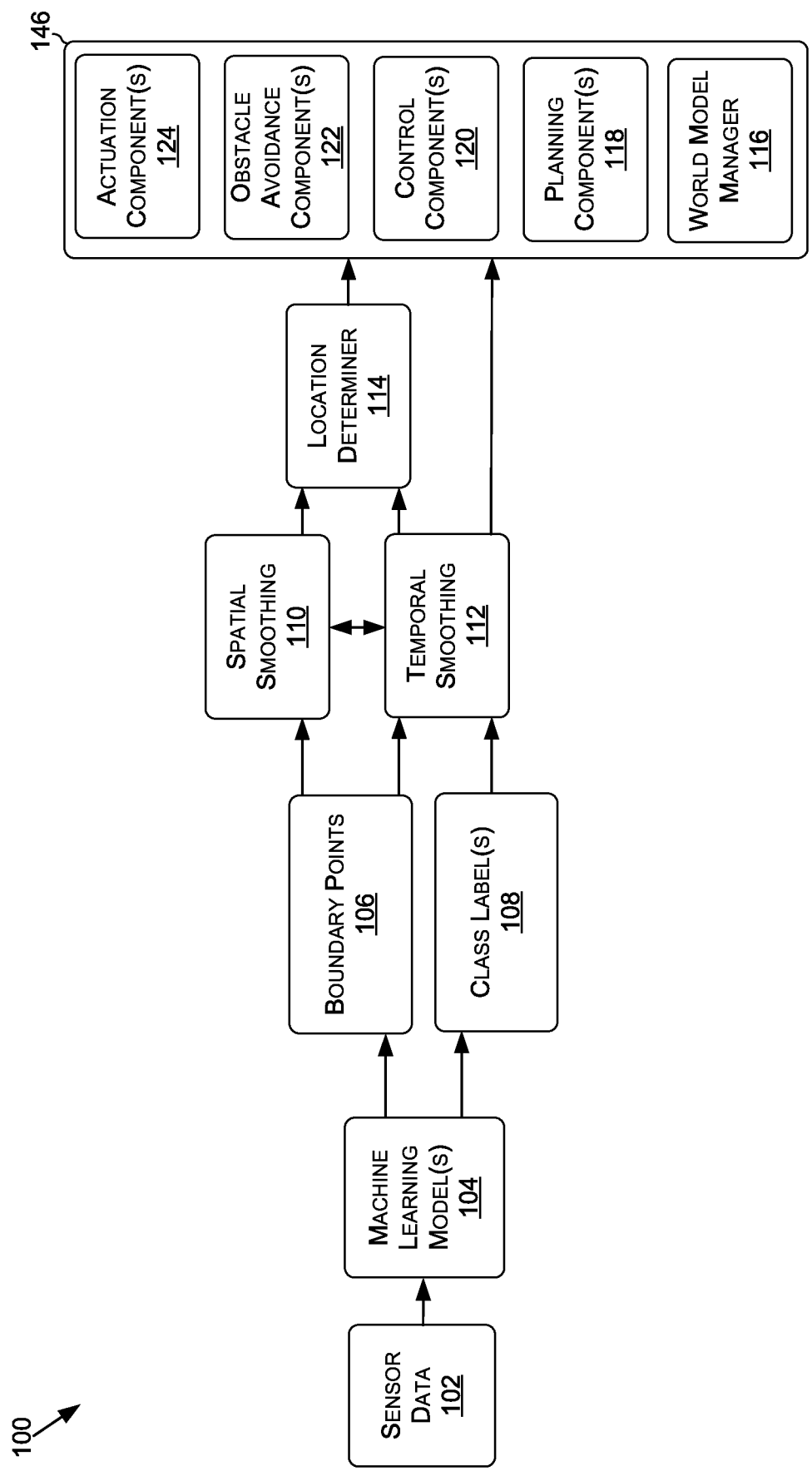
FIG. 1A is an illustration of a data flow diagram for boundary identification, in accordance with some embodiments of the present disclosure.

Systems and methods are disclosed related to determining drivable free-space for autonomous vehicles. The present disclosure may be described with respect to an example autonomous vehicle 700 (alternatively referred to herein as "vehicle 700" or "autonomous vehicle 700"), an example of which is described in more detail herein with respect to FIGS. 7A-7D. However, the disclosure is not limited to autonomous vehicles, and may be used in Advanced Driver Assistance Systems (ADAS), robotics, virtual reality (e.g., to determine free-space for movement of a player), and/or in other technology areas. As such, the description herein with respect to the vehicle 700 is for example purposes only, and is not intended to limit the disclosure to any one technology area.

Boundary Point and Class Label Detection System

As described herein, some conventional approaches to determining drivable free-space may rely on deep neural networks (DNN) for generating pixel-by-pixel segmentation information. However, segmentation approaches for determining drivable free-space are computationally expensive and require extensive post-processing in order for an autonomous driving system to make sense of and use the DNN output.

In conventional systems, column-wise regression may be used to determine obstacle positions for identifying drivable free-space. However, these conventional systems do not account for one or more boundary types or classes that make up or delineate the boundary, thereby minimizing the usefulness of the boundary location output by the DNN. For example, without information as to the boundary class (e.g., static, dynamic, vehicle, barrier, pedestrian, etc.), the location of the boundary may not be useful enough information to safely determine or react to drivable free-space (e.g., pedestrians, vehicles, and other dynamic objects may change location, while static objects may not). In addition, these conventional approaches use DNNs that require significant computing resources to implement and, as a result, may not operate effectively in real-time implementations. For example, conventional DNNs may use multiple fully-connected layers—each of which causes a drain on computing resources—in order to accurately regress on a boundary. As a result, even where a boundary is identified, the process may be unable to perform in real-time and—because the boundary classes may not be identified—the output may not be usable by the system in a way that allows the system to perform as safely as desired (e.g., because the system may not take into account the variable of dynamic boundary classes, such as pedestrians, vehicle, animals, etc.).

In contrast to these conventional systems, systems of the present disclosure may use a DNN—such as a convolutional neural network (CNN)—to regress on one or more boundary(ies) determined to divide drivable free-space from non-drivable space. In addition, the DNN may predict one or more boundary classes associated with the boundary(ies). By using regression rather than segmentation or classification in addition to performing the regression using a comparatively smaller footprint, less processing intensive DNN—such as by not including any fully connected layers, by including less fully connected layers than conventional approaches, by using a fully convolutional network, and/or the like—the DNN of present systems may be able to operate in real-time (e.g., at 30 frames per second (fps) or greater) while also outputting accurate and useable information. For example, the output of the DNN may be used by one or more layers of an autonomous driving software stack, such as a perception layer, a world model management layer, a planning layer, a control layer, an actuation layer, and/or another layer. As a result of the output including not only a location of the boundary, but also the boundary classes, the layer(s) of the autonomous driving software stack may be able to more effectively use the location by accounting for changes in the boundary as a result of one or more variables associated with the boundary class(es)—such as whether the boundary class(es) are static or dynamic, a person or a vehicle, a curb or a cement divider, etc.

In some examples, the output of the DNN may undergo one or more smoothing processes—such as spatial smoothing and/or temporal smoothing. As described herein, because regression may be used instead of segmentation, less complex and robust post-processing techniques may be used while achieving more accurate results. For example, spatial smoothing and/or temporal smoothing may require relatively less computational resources than conventional post-processing techniques for segmentation based approaches, and implementing spatial smoothing and/or temporal smoothing may be comparatively less complex.

Temporal smoothing may be applied to both boundary point locations and boundary class labels output by the DNN. Temporal smoothing may be used to increase the consistency of the result over time. Predicted boundary point locations and/or boundary class labels from one or more previous frames (e.g., image frames represented by sensor data) may be used to compute updated, or smooth, boundary point locations and/or boundary class labels of a current frame. As a result, boundary point locations and/or boundary class labels of a current frame may benefit from prior predictions of boundary point locations and/or boundary class labels, thereby resulting in a smoother, less noisy, output for use by the layer(s) of the autonomous driving software stack.

Spatial smoothing with a Gaussian filter may be applied to predicted boundary point locations. As a result, abrupt changes in the boundary point locations may be eliminated, or smoothed. For example, for a predicted boundary point location at a column of a current frame, values from one or more adjacent columns (e.g., as determined by the Gaussian filter radius) may be used to update, or smooth, the predicted boundary point location of the column. This process may be used for any number of the columns of the current frame, and may result in a smoother, less noisy, output for use by the layer(s) of the autonomous driving software stack.

The predicted boundary point locations may represent pixel locations within an image represented by the sensor data. The pixel locations may be two-dimensional (2D) coordinates in the image (e.g., a column and a row). The 2D coordinates may be converted to three-dimensional (3D) or 2D real-world coordinates corresponding to locations in the physical environment of the vehicle (e.g., global positioning system (GPS) coordinates or other global navigation satellite system (GNSS) coordinates). In order to accurately determine the relationship between the 2D coordinates and the real-world coordinates, 3D to 2D projection may be used. For example, a camera or other sensor(s) may be calibrated using one or more intrinsic (e.g., focal length, f, optical center ($u_0$, $v_0$), pixel aspect ratio, $\alpha$, skew, s, etc.) and/or extrinsic (e.g., 3D rotation, R, translation, t, etc.) camera parameters. One or more constraints may also be imposed, such as requiring that the 3D point always lies on the ground plane of the driving surface (e.g., because the boundary delineating drivable free-space may be part of, or may extend along, the driving surface). In some examples, one or more of the parameters of the camera may be dynamic (e.g., due to vibration, movement, orientation, etc.), and the 3D to 2D projection may be dynamically updated as a result. In some examples, such as where two or more cameras are used, stereo vision techniques may be used to determine a correlation between 2D points and 3D real-world locations.

In any example, the real-world coordinates may then be mapped to the 2D coordinates of the pixels in the image, such that when the boundary points are determined, the real-world coordinates are known and may be used by the autonomous driving software stack (or more generally, by the autonomous vehicle). More specifically, a distance from a camera center to the boundary in the real-world environment may be determined, and the autonomous vehicle may use the distance to each of the boundary points as a drivable free-space in which to operate.

When training the DNN, ground truth data may be generated for use in the training. For example, annotations may be generated (e.g., by a human, by a machine, or a combination thereof). The annotations may include a label for a pixel for each column within a training image. The pixel may be the first pixel in that particular column (beginning from the bottom of the image and moving to the top of the image—e.g., from closest to furthest from the vehicle in the real-world environment), that corresponds to a boundary that divides drivable free-space from non-drivable space. The annotations may also include indications of classes, which may be indicated by differing colors, shapes, and/or other attributes of the labels. As a result, the DNN may learn to identify not only boundary point locations, but also associated boundary class labels for each of the boundary point locations. In some examples, such as where two or more boundaries are annotated, there may be an annotation on a number of pixels in each column of the image that corresponds to the number of boundaries the DNN is being trained to detect. In addition, the different boundaries may include an additional label, such as drivable (or traversable) or non-drivable (or non-traversable). For example, a curb in front of a driveway or sidewalk may be a traversable boundary while a curb immediately before a building may be a non-traversable boundary. As such, the DNN may learn to differentiate drivable from non-drivable boundaries such that, in emergency situations or the like, the autonomous vehicle may determine to traverse the drivable boundary to avoid collision with an object or boundary. The DNN is not limited to computing traversable and non-traversable boundaries, and may additionally, or alternatively, compute any number of boundaries having any number of different class assignments.

During training, one or more loss functions may be used to compare the outputs or predictions of the DNN with the ground truth data. For example, a first (boundary) loss function may be used for the boundary point locations output by the DNN and a second (label) loss function may be used for the class labels output by the DNN. In some examples, the boundary loss function may include an L1 loss function and the label loss function may include a cross-entropy loss function. A weighted combination of the boundary loss function and the label loss function may be used for a final loss computation. In some examples, a weight ratio may be used between the boundary loss function and the weight loss function (e.g., 1:10, where 1 is for boundary and 10 is for label). An auto-weight scheme may be used that adjusts the cost weights adaptively or automatically when given target ratios for the weighted or final losses. The auto-weight scheme may be updated persistently, periodically (e.g., once per training epoch), and/or at another interval, to set the weights.

During training, one or more metrics may be used to evaluate the performance of a present system. For example, relative gap, precision, label accuracy, smoothness, weighted free-space precision (WFP), and/or weighted free-space recall (WFR) may be used. Relative gap may measure the average of the absolute deviation between a ground truth boundary curve and a predicted boundary curve. Precision may measure the amount of overshoot of the predicted boundary curve from the ground truth boundary curve (e.g., the amount of non-drivable space determined to be drivable free-space by the DNN). Label accuracy may measure the accuracy of the predicted boundary class labels in comparison to the ground truth boundary class labels. Smoothness may measure the smoothness of the predicted curve (e.g., the mean of the difference between consecutive boundary points of the boundary curve). WFP may include a precision calculation using only overshoot, such that if there is no overshoot, the precision may be 1.0 (e.g., a near perfect match between ground truth and prediction). WFR may include a precision calculation using only undershoot, such that if there is no undershoot, the precision may be 1.0 (e.g., a near perfect match between ground truth and prediction). For WFP and WFR, in some examples, the weight for different boundary class labels may be different, such that some boundary classes or types have a higher associated weight. For example, pedestrians may have a higher associated weight than a curb because accuracy with respect to a human is more pertinent than with respect to a curb.

Figure 7A:
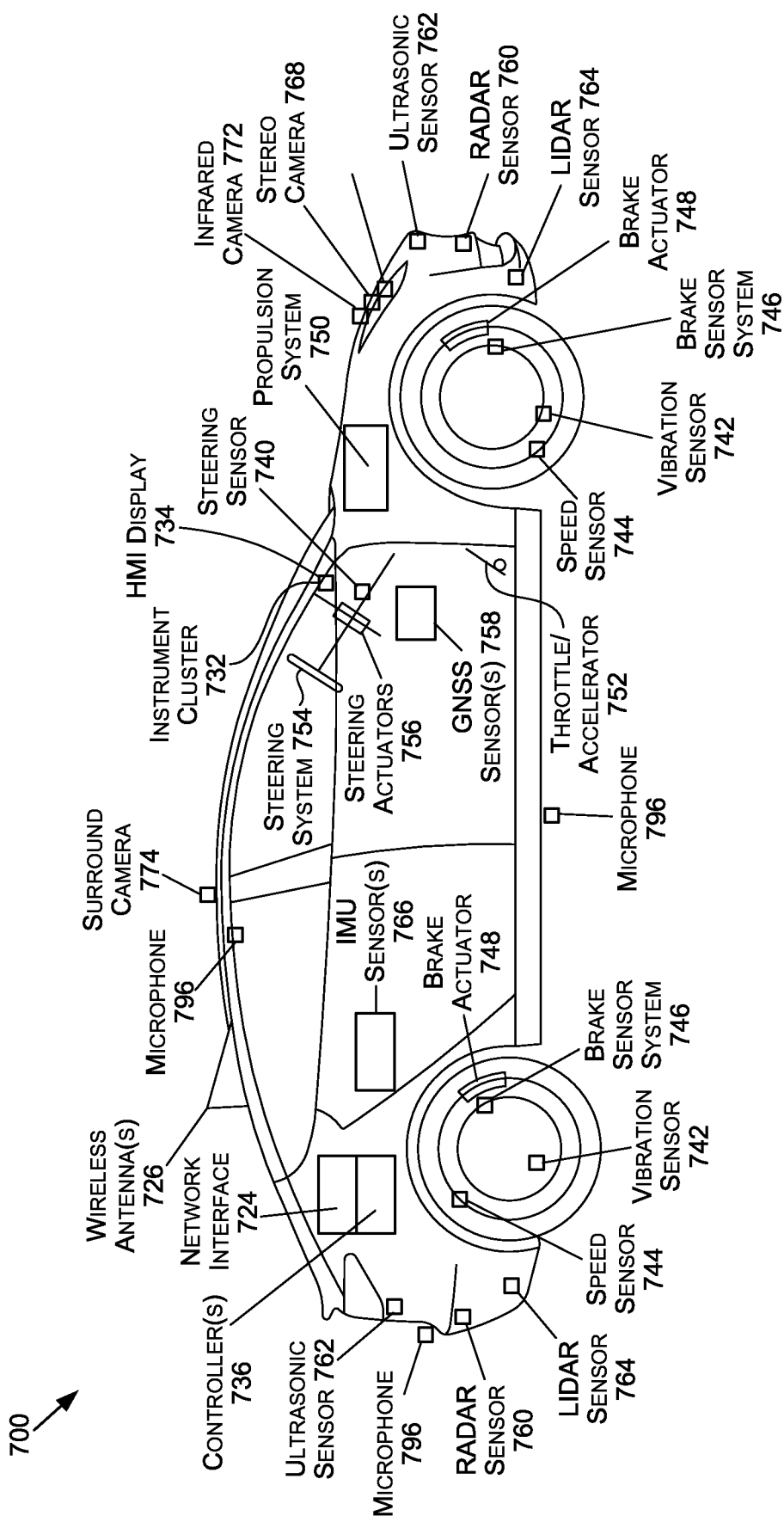
FIG. 7A is an illustration of an example autonomous vehicle, in accordance with some embodiments of the present disclosure.
Figure 7B:
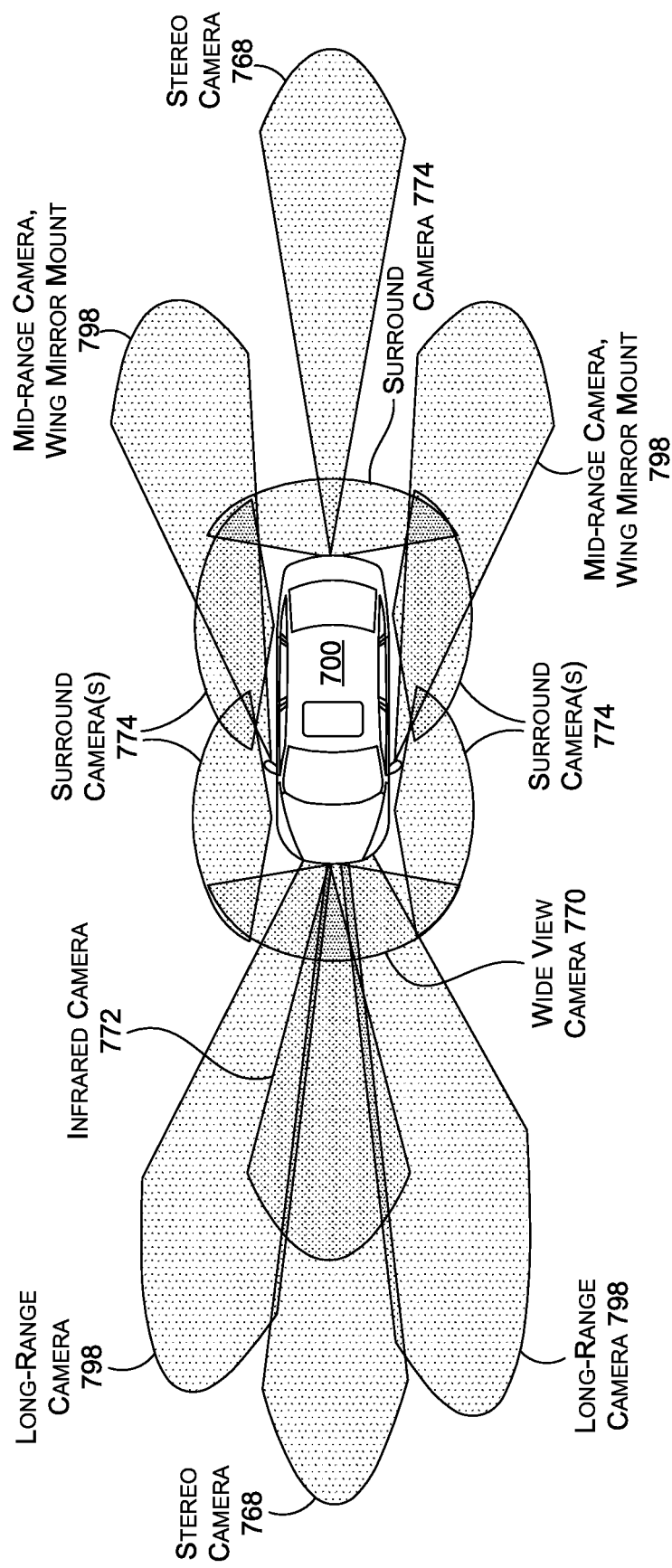
FIG. 7B is an example of camera locations and fields of view for the example autonomous vehicle of FIG. 7A, in accordance with some embodiments of the present disclosure.
Figure 7C:
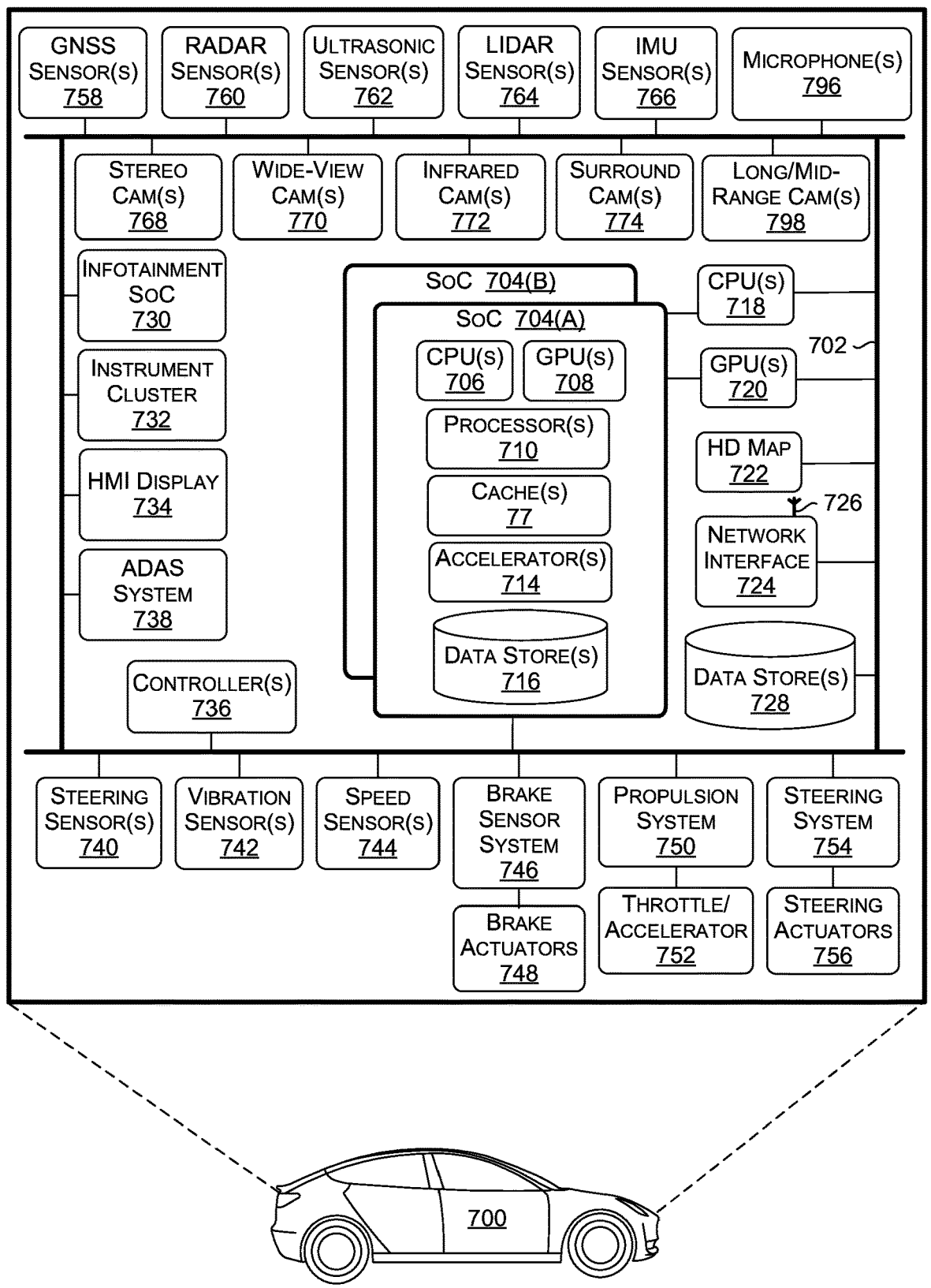
FIG. 7C is a block diagram of an example system architecture for the example autonomous vehicle of FIG. 7A, in accordance with some embodiments of the present disclosure.

Now referring to FIG. 1A, FIG. 1A is an illustration of a data flow diagram for a process 100 of boundary identification, in accordance with some embodiments of the present disclosure. The process 100 for boundary identification may include generating and/or receiving sensor data 102 from one or more sensors of the autonomous vehicle 700. The sensor data 102 may include sensor data from any of the sensors of the vehicle 700 (and/or other vehicles or objects, such as robotic devices, VR systems, AR systems, etc., in some examples). With reference to FIGS. 7A-7C, the sensor data 102 may include the data generated by, for example and without limitation, global navigation satellite systems (GNSS) sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

In some examples, the sensor data 102 may include the sensor data generated by one or more forward-facing cameras (e.g., a center or near-center mounted camera(s)) when the vehicle 700 is moving forward, such as a wide-view camera 770, a surround camera 774, a stereo camera 768, and/or a long-range or mid-range camera 798. When the vehicle 700 is moving in reverse, one or more rear-facing cameras may be used. In some examples, one or more side-facing cameras and/or one or more parking cameras may be used to determine drivable free-space to the side of the vehicle 700 and/or immediately adjacent the vehicle 700. More than one camera or other sensor (e.g., LIDAR sensor, RADAR sensor, etc.) may be used to incorporate multiple fields of view (e.g., the fields of view of the long-range cameras 798, the forward-facing stereo camera 768, and/or the forward facing wide-view camera 770 of FIG. 7B). In any example, the sensor data 102 used by machine learning model(s) 104 may be the sensor data 102 determined to be most useful for determining drivable free-space and non-drivable space in a current direction of travel of the vehicle 700.

The sensor data 102 may include image data representing an image(s), image data representing a video (e.g., snapshots of video), and/or sensor data representing fields of view of sensors (e.g., LIDAR data from LIDAR sensor(s) 764, RADAR data from RADAR sensor(s) 760, etc.). In some examples, the sensor data 102 may be input into the machine learning model(s) 104 and used by the machine learning model(s) 104 to compute boundary points 106 and/or class labels 108. In some other examples, the sensor data 102 may be provided as input to a sensor data pre-processor (not shown) to generate pre-processed sensor data. The pre-processed sensor data may then be input into the machine learning model(s) 104 as input data in addition to, or alternatively from, the sensor data 102.

In examples where the senor data 102 is image data, many types of images or formats may be used as inputs. For example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. It is noted that different formats and/or resolutions could be used training the machine learning model(s) 104 than for inferencing (e.g., during deployment of the machine learning model(s) 104 in the autonomous vehicle 700).

The sensor data pre-processor may use the sensor data 102 representative of one or more images (or other data representations) and load the sensor data into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the machine learning model(s) 104.

Figure 1B:
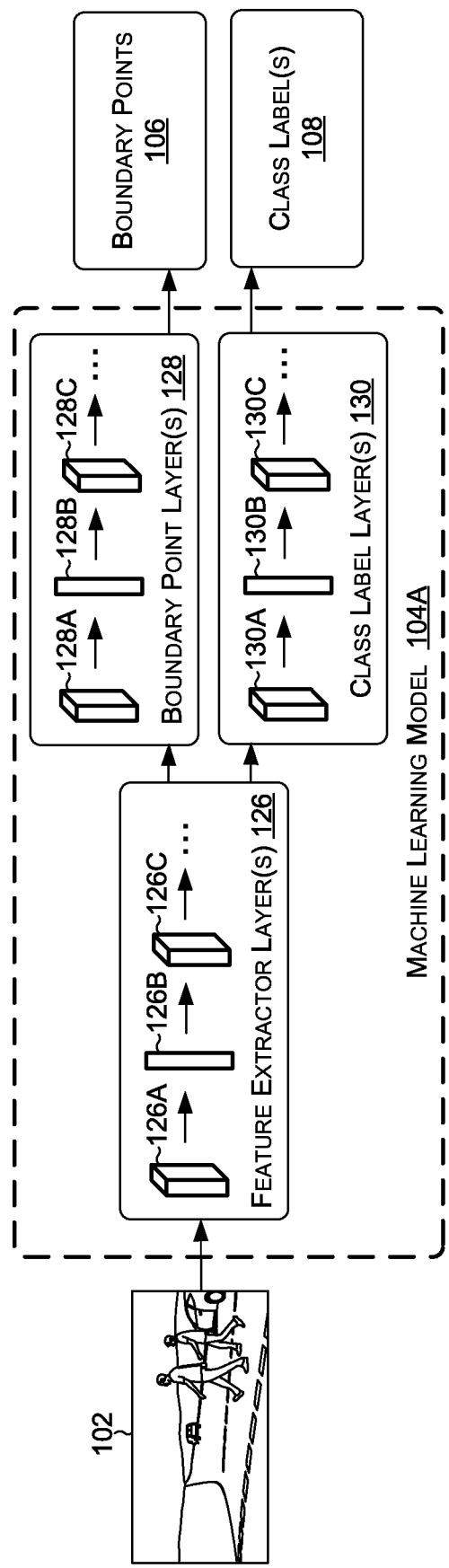
FIG. 1B is an illustration of an example machine learning model for boundary identification, in accordance with some embodiments of the present disclosure.

A pre-processing image pipeline may be employed by the sensor data pre-processor to process a raw image(s) acquired by a sensor(s) and included in the sensor data 102 to produce the pre-processed sensor data which may represent an input image(s) to the input layer(s) (e.g., feature extractor layer(s) 126 of FIG. 1B) of the machine learning model(s) 104. An example of a suitable pre-processing image pipeline may use a raw RCCB Bayer (e.g., 1-channel) type of image from the sensor and convert that image to an RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

The machine learning model(s) 104 may use as input one or more images (or other data representations) represented by the sensor data 102 to generate the boundary points 106 (e.g., representative of 2D pixel locations of boundary(ies) within the image) and/or the class labels 108 (e.g., boundary class labels corresponding to boundary classes associated with the boundary(ies)) as output. In a non-limiting example, the machine learning model(s) 104 may take as input an image(s) represented by the pre-processed sensor data and/or the sensor data 102, and may use the sensor data to regress on the boundary points 106 and to generate predictions for the class labels 108 that correspond to the boundary points 106.

Although examples are described herein with respect to using neural networks, and specifically convolutional neural networks, as the machine learning model(s) 104 (e.g., as described in more detail herein with respect to FIGS. 1B and 1C), this is not intended to be limiting. For example, and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The boundary points 106 may represent points (or pixels) of an image represented by the sensor data that correspond to one or more boundaries dividing drivable free-space from non-drivable space in a real-world environment of the vehicle 700. For example, for each boundary there may be one boundary point 106 (or more, in some examples) for each column of the image (e.g., as a result of regression analysis by the machine learning model(s) 104), which may depend on the spatial width of the image (e.g., for a 1920 W×1020 H image, there may be 1920 boundary points 106 for each boundary of the one or more boundaries). As a result, a boundary may be determined in the real-world environment across the entire lateral dimension of the field of view of the sensor(s) (e.g., the camera(s)) based on the boundary points 106.

Figure 1C:
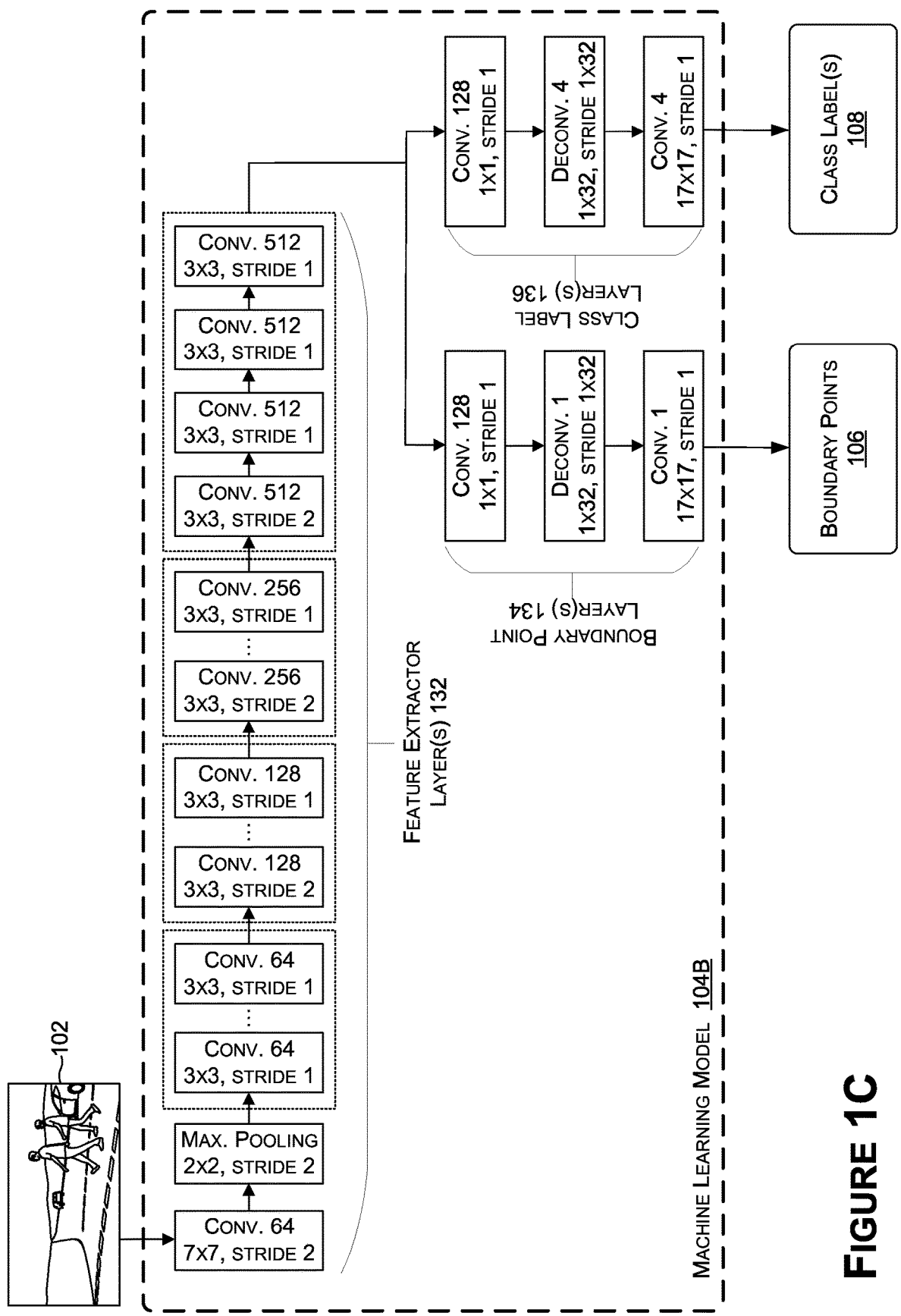
FIG. 1C is another illustration of an example machine learning model for boundary identification, in accordance with some embodiments of the present disclosure.
Figure 1D:
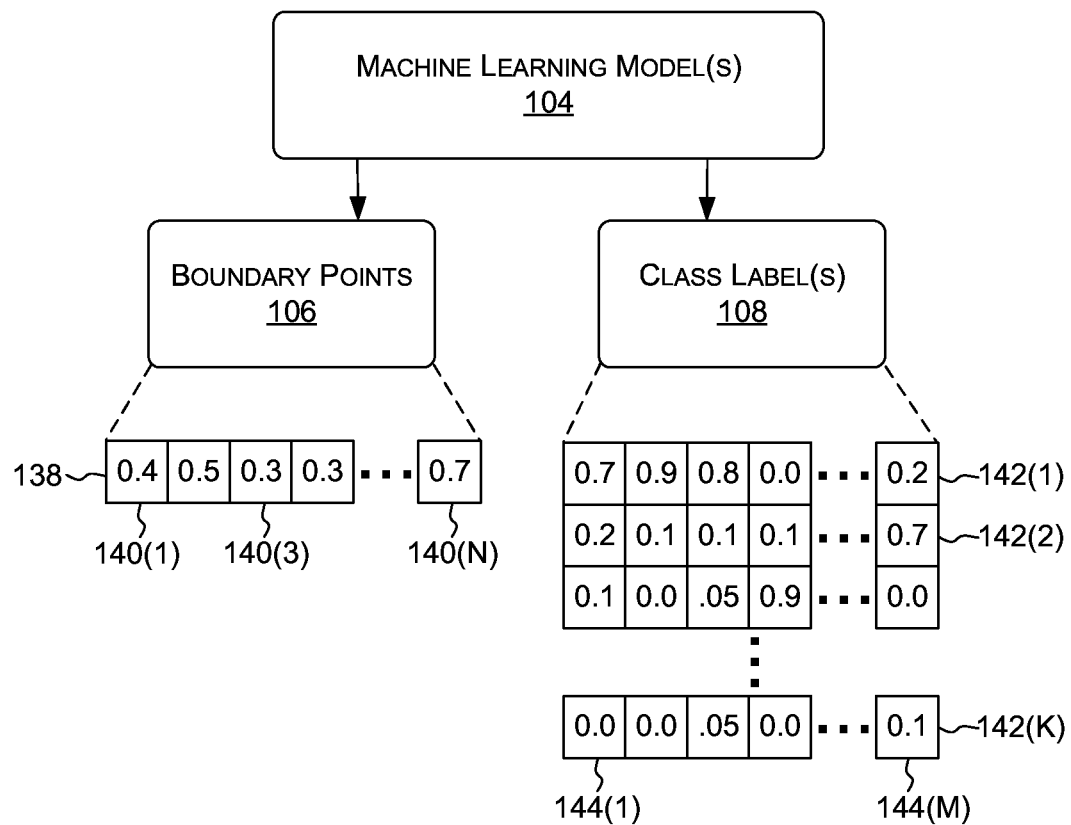
FIG. 1D is an illustration of an example output of a machine learning model for boundary identification, in accordance with some embodiments of the present disclosure.

As described in more detail herein with respect to FIG. 1D, in some non-limiting examples the boundary points 106 may be output by the machine learning model(s) 104 as a one dimensional array (e.g., with one row, and a number of columns corresponding to the spatial width of the image). In such examples, each cell may include a value between 0 and 1 corresponding to a percentage of the spatial height of the image where the boundary point 106 (or pixel) for that column is located (e.g., the boundary points 106 output by the machine learning model 104 may be normalized to the height of the image). As such, if the image has a spatial height of 100, and the value in the first cell corresponding to the first column of the image is 0.5, the boundary point 106 for the first column may be determined to be at pixel 50. A one dimensional array may be the output of the machine learning model(s) 104 where the machine learning model(s) is used to regress on the boundary within the image.

In other examples, the boundary points 106 output by the machine learning model(s) 104 may be in a different format, such as a value(s) corresponding to the actual pixel within the column, a value(s) based on a distance from center of the image, and/or another format. In such examples, the output may not be a one dimensional array, but may be of any dimension (e.g., a number of columns corresponding to the spatial width of the image and a number of rows corresponding to the spatial width of the image, and/or other dimensions).

The class labels 108 may represent, for each of the boundary points 106, a boundary class or type that corresponds to the boundary point 106. For example, for a first boundary point 106 a class label 108 may be for a pedestrian, for a second boundary point 106 a class label 108 may be for a vehicle, for a third boundary point a class label 108 may be for a barrier, and so on. There may be any number of class labels 108 that the machine learning model(s) 104 is trained to identify and label. In one non-limiting example, there may be four class labels 108 corresponding to four classes including vehicles, pedestrians, barriers or curbs, and a catchall or unidentified class (e.g., boundary types that don't fall into any of the other boundary classes or cannot be confidently placed into one of the other boundary classes). In other examples, there may be less than four class labels 108 or more than four class labels 108, and/or the class labels 108 may be more or less granular. For example, the class labels 108 may correspond to less granular classes such as static or dynamic, or to more granular classes such as sedan, sport utility vehicle (SUV), truck, bus, adult, child, curb, divider, guardrail, etc.

As described in more detail herein with respect to FIG. 1D, in some non-limiting examples the class labels 108 may be output (e.g., computed) by the machine learning model(s) 104 as a two-dimensional array (e.g., with a number of rows corresponding to the number of classes the machine learning model(s) 104 is trained to identify and label, and a number of columns corresponding to the spatial width of the image). In such examples, each of the cells in each column of the array may include a value between 0 and 1 (e.g., with a sum of all values for each column equaling 1) corresponding to a probability or confidence of the class label 108 that corresponds to the boundary point 106 from the same column.

The boundary points 106 and/or the class labels 108 may undergo one or more post-processing operations using one or more post-processing techniques. For example, the boundary points 106 may undergo spatial smoothing 110. The spatial smoothing 110 may be executed with a Gaussian filter, as described herein, and may be applied to the boundary points 106 predicted (e.g., as the output) by the machine learning model(s) 104. The goal of the spatial smoothing 110 may be to eliminate abrupt changes in the boundary between adjacent sets of the boundary points 106. The spatial smoothing 110 may be executed on the boundary points 106 from a single frame of the sensor data in view of others of the boundary points 106 from the same single frame. For example, one or more of the boundary points 106 corresponding to the boundary from a single frame may be filtered or smoothed (e.g., using a Gaussian filter) by using information (e.g., values) corresponding to one or more adjacent boundary points 106. As such, when a first boundary point 106 is significantly different from an adjacent second boundary point 106, the spatial smoothing 110 may be used to create a less harsh or drastic transition between the first and second boundary points 106.

In some non-limiting examples, the spatial smoothing 110 may be implemented using equation (1), below:

$$\text{boundary}_{spatial} = [\text{col.}_{curr.}] \Sigma_{idx=0}^{Length(gauss_{filter})}$$
$$\text{boundary}_{curr.}[\text{col.}_{curr.} - \text{radius}_{gauss_{filter}} + idx]$$
$$* gauss_{filter[idx]} \qquad (1)$$

where gauss_filter is a Gaussian filter array, $\text{col.}_{curr.}$ is a current column, $\text{radius}_{gauss\_filter}$ is the radius of the Gaussian filter, $\text{boundary}_{spatial}$ is the boundary array after spatial smoothing, and idx is an index (e.g., that goes from 0 to a length of the Gaussian filter array in equation (1)).

As another example of post-processing, the boundary points 106 and/or the class labels 108 may undergo temporal smoothing 112. The goal of the temporal smoothing 112 may be to eliminate abrupt changes in the boundary points 106 and/or the class labels 108 between a current frame and one or more prior frames of the sensor data. As such, the temporal smoothing 112 may look at boundary points 106 and/or class labels 108 of a current frame in view of boundary points 106 and/or class labels 108 of one or more prior frames to smooth the values of the boundary points 106 and/or the class labels 108 so that differences between successive frames may not be as drastic. In some examples, the prior frames may each have been weighted or smoothed based on its prior frame(s), and as a result, each successive frame may be a weighted representation of a number or prior frames (e.g., all prior frames). As such, when a first boundary point 106 and/or a first class label 108 is significantly different from a prior second boundary point 106 and/or second class label 108, the temporal smoothing 112 may be used to create a less harsh or drastic transition between the first and second boundary points 106.

In some non-limiting examples, the temporal smoothing 112 for the boundary points 106 may be implemented using equation (2), below:

$$\text{boundary}_{smooth} = \alpha * \text{boundary}_{prev.} + (1-\alpha) * \text{boundary}_{curr.} \quad (2)$$

where $\alpha$ is a real number between 0 and 1, $\text{boundary}_{prev}$ denotes a boundary array (e.g., an array of boundary points 106) in a previous frame, $\text{boundary}_{curr.}$ denotes a boundary array in a current frame, $\text{boundary}_{smooth}$ denotes a boundary array after the temporal smoothing 112.

In some examples, $\alpha$ may be set to a default value. For example, the default value may be 0.5 in one non-limiting example. However, the value for $\alpha$ may be different depending on the embodiment. Where $\alpha$ is 0.5, for example, the weighting between a boundary point 106 and an adjacent boundary point(s) 106 may be 50% for the boundary point 106 and 50% for the adjacent boundary point(s) 106. In examples where the boundary point 106 is to be weighted more heavily than the adjacent boundary point(s) 106, the value of $\alpha$ may be lower, such as 0.3, 0.4, etc., and where the boundary points is to be weighted less heavily than the adjacent boundary point(s) 106, the value of $\alpha$ may be higher, such as 0.6., 0.7, etc.

In some non-limiting examples, the temporal smoothing 112 for the class labels 108 may be implemented using equation (3), below:

$$\text{label\_prob}_{smooth} = \alpha * \text{label\_prob}_{prev.} + (1-\alpha) * \text{label\_prob}_{curr.} \quad (3)$$

where $\alpha$ is a real number between 0 and 1, $\text{label\_prob}_{prev}$ denotes a class label probability array (e.g., an array of predictions for class labels 108) in a previous frame, $\text{label\_prob}_{curr.}$ denotes a class label probability array in a current frame, $\text{label\_prob}_{smooth}$ denotes a class label probability array after the temporal smoothing 112.

In some examples, $\alpha$ may be set to a default value. For example, the default value may be 0.5 in one non-limiting example. However, the value for $\alpha$ may be different depending on the embodiment. Where $\alpha$ is 0.5, for example, the weighting between a prior frame(s) and a current frame may be 50% for a current frame and 50% for prior frame(s). In examples where a current frame is weighted more heavily than a prior frame(s), the value of $\alpha$ may be lower, such as 0.3, 0.4, etc., and where the current frame is to be weighted less heavily than the prior frame(s), the value of $\alpha$ may be higher, such as 0.6., 0.7, etc.

The spatial smoothing 110 and/or the temporal smoothing 112 may individually be performed, may both be performed, and may be performed in any order. For example, only the spatial smoothing 110 or only the temporal smoothing 112 may be performed. As another example, both the spatial smoothing 110 and the temporal smoothing 112 may be performed. In such examples, the spatial smoothing 110 may be performed prior to the temporal smoothing 112, the temporal smoothing 112 may be performed prior to the spatial smoothing 110, and/or both may be performed simultaneously or in parallel. In some examples, the spatial smoothing 110 may be performed on the output after the temporal smoothing 112, or the temporal smoothing 112 may be performed on the output after the spatial smoothing 110.

The boundary points 106 computed by the machine learning model(s) 104—after post-processing in some examples—may be converted from 2D point or pixel locations of the sensor data (e.g., of an image) to 3D or 2D real-world coordinates. In some examples, location determiner 114 may determine a real-world, 3D location of the boundary based on the 2D point or pixel coordinates. Using intrinsic camera parameters (e.g., focal length, f, optical center ($u_0$, $v_0$), pixel aspect ratio, $\alpha$, skew, s, etc.), extrinsic camera parameters (e.g., 3D rotation, R, translation, t, etc.), and/or a height of the camera with respect to a ground plane, a 3D distance from the boundary (e.g., the boundary delineated by the boundary points 106) to the camera center may be computed. The real-world coordinate system and the camera coordinate system may be assumed to be the same coordinate system. As a result, a projective matrix, P, may be expressed according to equation (4), below:

$$P = [K 0]_{3 \times 4} \quad (4)$$

where K is a 3×3 dimensional intrinsic camera matrix.

In order to perform 3D to 2D projection, for any point, [X, Y, Z], on the road or driving surface, a corresponding pixel, [u,v], may be determined in an image that satisfies equation (5), below:

$$\lambda \begin{bmatrix} u \\ v \\ 1 \end{bmatrix} = \begin{bmatrix} K \\ 0 \end{bmatrix}_{3 \times 4} \begin{bmatrix} X \\ Y \\ Z \\ 1 \end{bmatrix} \quad (5)$$

where $\lambda$ is a scaling constant in homogeneous coordinates and K is a 3×3 dimensional intrinsic camera matrix.

A pixel, p, in the image may be mapped to an infinite number of 3D points along the line which connects the camera center and the pixel, p. As such, in order to determine the corresponding 3D position of the pixel, p, one or more constraints may be imposed and/or stereo vison may be leveraged, depending on the embodiment. In examples where a constraint is imposed, the constraint may be that the 3D point always lies on the ground plane of the road or driving surface. The ground plane, in some examples, may satisfy the relationship illustrated in equation (6), below:

$$n^T x + c = 0 \quad (6)$$

where $x = [X \ Y \ Z]^T$, c is a constant related to a height of the camera center from the ground plane (e.g., if the camera center it 1.65 meters from the ground plane, c=1.65), T is time, and, when assuming that the camera is orthogonal to the ground plane, in the camera coordinate system $n = [0 \ -1 \ 0]^T$.

Since the position of the pixel, p, on the boundary may be known, the 3D location corresponding to the pixel,p, may be derived from a 3D to 2D projection equation (7), as a function of λ and K:

$$x=[X\ Y\ Z]^T=\lambda K^{-1}p \qquad (7)$$

where $p=[u\ v\ 1]^T$. Using the solution of the 3D point in the equation for the ground plane result in the following relationship, represented by equation (8), below:

$$\mu n^T K^{-1}p+c=0 \qquad (8)$$

Thus, $$\lambda = \frac{-c}{n^T K^{-1}p} \qquad (9)$$

Combining equations (8) and (9), results in equation (10), below:

$$x = \frac{-c}{n^T K^{-1}p}(K^{-1}p) \qquad (10)$$

The distance from the boundary to the vehicle 700 across the ground plane may be determined by subtracting the projection of the camera center on the ground plane from x, such as represented in equation (11), below:

$$d=\|x-C''\|_2 \qquad (11)$$

where C" is the projection of the camera center on the ground plane equaling $h=[0\ 1.65\ 0]^T$, assuming the height of the camera from the ground plane is 1.65 meters. In addition, a distance, $d_f$, may be determined from the boundary to the front of the vehicle 700 by considering the distance from the camera center to the front of the ground plane (e.g., along the z-axis), or to the front of the vehicle. For example, assuming that the camera center is 2.85 meters away from the front of the ground plane, the distance, $d_f$, may be determined using equation (12), below:

$$d_f=d-2.85 \qquad (12)$$

Although this example of 3D to 2D projection for determining distance from the vehicle 700 to the boundary is described herein, this is not intended to be limiting. For example, any method of determining real-world coordinates from image coordinates may be used to determine the distance from the vehicle 700 to the boundary, and thus the drivable free-space for the vehicle 700 to move around within. As an example, 3D object coordinates may be determined, a modeling transformation may be used to determine 3D real-world coordinates corresponding to the 3D object coordinates, a viewing transformation may be used to determine 3D camera coordinates based on the 3D real-world coordinates, a projection transformation may be used to determine 2D screen coordinates based on the 3D camera coordinates, and/or a window-to-viewport transformation may be used to determine 2D image coordinates form the 2D screen coordinates. In general, real-world coordinates may be converted to camera coordinates, camera coordinates may be converted to film coordinates, and film coordinates may be converted to pixel coordinates. Once the pixel coordinates are known, and the boundary is determined (e.g., the boundary points 106 are determined), the location of the boundary in the real-world coordinates may be determined using the known mapping from the boundary points 106 to the real-world coordinates.

In other examples, stereo vision may be leveraged to determine a correlation between the 2D and 3D coordinates, such as where two or more cameras are used. In such examples, stereo vision techniques may be used to determine distances to the boundary using information from two or more images generated from two or more cameras (or other sensors, such as LIDAR sensors).

The boundary points 106 (e.g., the real-world locations corresponding to the boundary points 106, after post-processing) and the class labels 108 (e.g., after post-processing) may be used by one or more layers of an autonomous driving software stack 146 (alternatively referred to herein as "drive stack 146"). The drive stack 146 may include a sensor manager (not shown), perception component(s) (e.g., corresponding to a perception layer of the drive stack 146), a world model manager 116, planning component(s) 118 (e.g., corresponding to a planning layer of the drive stack 146), control component(s) 120 (e.g., corresponding to a control layer of the drive stack 146), obstacle avoidance component(s) 122 (e.g., corresponding to an obstacle or collision avoidance layer of the drive stack 146), actuation component(s) 124 (e.g., corresponding to an actuation layer of the drive stack 146), and/or other components corresponding to additional and/or alternative layers of the drive stack 146. The process 100 may, in some examples, be executed by the perception component(s), which may feed up the layers of the drive stack 146 to the world model manager, as described in more detail herein.

The sensor manager may manage and/or abstract sensor data 102 from the sensors of the vehicle 700. For example, and with reference to FIG. 7C, the sensor data 102 may be generated (e.g., perpetually, at intervals, based on certain conditions) by global navigation satellite system (GNSS) sensor(s) 758, RADAR sensor(s) 760, ultrasonic sensor(s) 762, LIDAR sensor(s) 764, inertial measurement unit (IMU) sensor(s) 766, microphone(s) 796, stereo camera(s) 768, wide-view camera(s) 770, infrared camera(s) 772, surround camera(s) 774, long range and/or mid-range camera(s) 798, and/or other sensor types.

The sensor manager may receive the sensor data from the sensors in different formats (e.g., sensors of the same type, such as LIDAR sensors, may output sensor data in different formats), and may be configured to convert the different formats to a uniform format (e.g., for each sensor of the same type). As a result, other components, features, and/or functionality of the autonomous vehicle 700 may use the uniform format, thereby simplifying processing of the sensor data. In some examples, the sensor manager may use a uniform format to apply control back to the sensors of the vehicle 700, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 116 may be used to generate, update, and/or define a world model. The world model manager 116 may use information generated by and received from the perception component(s) of the drive stack 146 (e.g., the locations of the boundary dividing drivable free-space from non-drivable space and the class labels 108). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 116 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 118, control component(s) 120, obstacle avoidance component(s) 122, and/or actuation component(s) 124 of the drive stack 146. The obstacle perceiver may perform obstacle perception that may be based on where the vehicle 700 is allowed to drive or is capable of driving (e.g., based on the location of the boundary determined from the boundary points 106 and/or based on the class labels 108), and how fast the vehicle 700 can drive without colliding with an obstacle (e.g., an object, such as a structure, entity, vehicle, etc.) that is sensed by the sensors of the vehicle 700.

The path perceiver may perform path perception, such as by perceiving nominal paths that are available in a particular situation. In some examples, the path perceiver may further take into account lane changes for path perception. A lane graph may represent the path or paths available to the vehicle 700, and may be as simple as a single path on a highway on-ramp In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 700 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the vehicle 700 that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data 102 from the sensors, because the obstacles may be occluded from field of views of the sensors). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 700 of static or stationary infrastructure objects and obstacles. The map perceiver may also generate information for the wait perceiver and/or the path perceiver, for example, such as to determine which light at an intersection has to be green for the vehicle 700 to take a particular path.

Figure 7D:
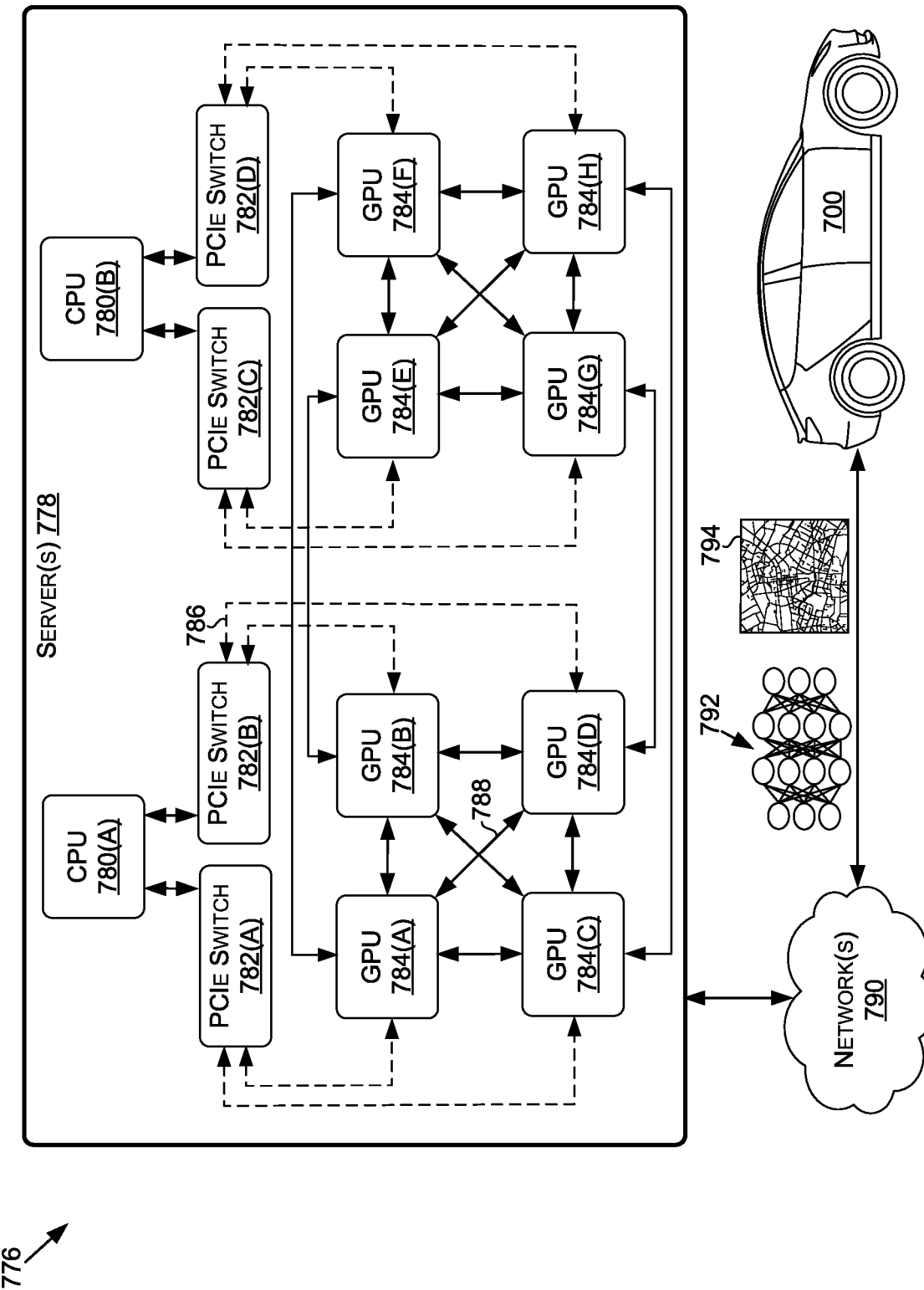
FIG. 7D is a system diagram for communication between cloud-based server(s) and the example autonomous vehicle of FIG. 7A, in accordance with some embodiments of the present disclosure.

In some examples, information from the map perceiver may be sent, transmitted, and/or provided to server(s) (e.g., to a map manager of server(s) 778 of FIG. 7D), and information from the server(s) may be sent, transmitted, and/or provided to the map perceiver and/or a localization manager of the vehicle 700. The map manager may include a cloud mapping application that is remotely located from the vehicle 700 and accessible by the vehicle 700 over one or more network(s). For example, the map perceiver and/or the localization manager of the vehicle 700 may communicate with the map manager and/or one or more other components or features of the server(s) to inform the map perceiver and/or the localization manager of past and present drives or trips of the vehicle 700, as well as past and present drives or trips of other vehicles. The map manager may provide mapping outputs (e.g., map data) that may be localized by the localization manager based on a particular location of the vehicle 700, and the localized mapping outputs may be used by the world model manager 116 to generate and/or update the world model.

The planning component(s) 118 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the vehicle 700, such as a number of city blocks, a number of kilometers, a number of feet, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 700, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 120 may follow a trajectory or path (lateral and longitudinal) that has been received from the behavior selector of the planning component(s) 118 as closely as possible and within the capabilities of the vehicle 700. In some examples, the remote operator may determine the trajectory or path, and may thus take the place of or augment the behavior selector. In such examples, the remote operator may provide controls that may be received by the control component(s) 120, and the control component(s) may follow the controls directly, may follow the controls as closely as possible within the capabilities of the vehicle, or may take the controls as a suggestion and determine, using one or more layers of the drive stack 146, whether the controls should be executed or whether other controls should be executed.

The control component(s) 120 may use tight feedback to handle unplanned events or behaviors that are not modeled and/or anything that causes discrepancies from the ideal (e.g., unexpected delay). In some examples, the control component(s) 120 may use a forward prediction model that takes control as an input variable, and produces predictions that may be compared with the desired state (e.g., compared with the desired lateral and longitudinal path requested by the planning component(s) 118). The control(s) that minimize discrepancy may be determined.

Although the planning component(s) 126 and the control component(s) 120 are illustrated separately, this is not intended to be limiting. For example, in some embodiments, the delineation between the planning component(s) 118 and the control component(s) 120 may not be precisely defined. As such, at least some of the components, features, and/or functionality attributed to the planning component(s) 118 may be associated with the control component(s) 120, and vice versa.

The obstacle avoidance component(s) 122 may aid the autonomous vehicle 700 in avoiding collisions with objects (e.g., moving and stationary objects). The obstacle avoidance component(s) 122 may include a computational mechanism at a "primal level" of obstacle avoidance, and may act as a "survival brain" or "reptile brain" for the vehicle 700. In some examples, the obstacle avoidance component(s) 122 may be used independently of components, features, and/or functionality of the vehicle 700 that is required to obey traffic rules and drive courteously. In such examples, the obstacle avoidance component(s) may ignore traffic laws, rules of the road, and courteous driving norms in order to ensure that collisions do not occur between the vehicle 700 and any objects. As such, the obstacle avoidance layer may be a separate layer from the rules of the road layer, and the obstacle avoidance layer may ensure that the vehicle 700 is only performing safe actions from an obstacle avoidance standpoint. The rules of the road layer, on the other hand, may ensure that vehicle obeys traffic laws and conventions, and observes lawful and conventional right of way (as described herein).

In some examples, the locations of the boundary(ies) and the class labels 108 may be used by the obstacle avoidance component(s) 122 in determining controls or actions to take. For example, the drivable free-space may provide an indication to the obstacle avoidance component(s) 122 of where the vehicle 700 may maneuver without striking any objects, structures, and/or the like. As another example, such as where the class labels 108 include traversable and non-traversable labels, or where a first boundary is traversable and another boundary is not traversable, the obstacle avoidance component(s) 122 may—such as in an emergency situation—traverse the traversable boundary to enter potentially non-drivable space (e.g., a sidewalk, a grass area, etc.) that has been determined to be safer than continuing within the drivable free-space (e.g., as a result of a suspected collision).

In some examples, as described herein, the obstacle avoidance component(s) 122 may be implemented as a separate, discrete feature of the vehicle 700. For example, the obstacle avoidance component(s) 122 may operate separately (e.g., in parallel with, prior to, and/or after) the planning layer, the control layer, the actuation layer, and/or other layers of the drive stack 146.

Now referring to FIG. 1B, FIG. 1B is an illustration of an example machine learning model 104A for boundary identification, in accordance with some embodiments of the present disclosure. The machine learning model 104A may be one example of a machine learning model 104 that may be used in the process 100 of FIG. 1A. The machine learning model 104A may include or be referred to as a convolutional neural network and thus may alternatively be referred to herein as convolutional neural network 104A or convolutional network 104A.

As described herein, the machine learning model 104A may use sensor data 102 (and/or pre-processed sensor data) (illustrated as an image in FIG. 1B) as an input. The sensor data 102 may include images representing image data generated by one or more cameras (e.g., one or more of the cameras described herein with respect to FIGS. 7A-7C). For example, the sensor data 102 may include image data representative of a field of view of the camera(s). More specifically, the sensor data 102 may include individual images generated by the camera(s), where image data representative of one or more of the individual images may be input into the convolutional network 104A at each iteration of the convolutional network 104A.

The sensor data 102 may be input as a single image, or may be input using batching, such as mini-batching. For example, two or more images may be used as inputs together (e.g., at the same time). The two or more images may be from two or more sensors (e.g., two or more cameras) that captured the images at the same time.

The sensor data 102 and/or pre-processed sensor data may be input into a feature extractor layer(s) 126 of the convolutional network 104 (e.g., feature extractor layer 126A). The feature extractor layer(s) 126 may include any number of layers 126, such as the layers 126A-126C. One or more of the layers 126 may include an input layer. The input layer may hold values associated with the sensor data 102 and/or pre-processed sensor data. For example, when the sensor data 102 is an image(s), the input layer may hold values representative of the raw pixel values of the image(s) as a volume (e.g., a width, W, a height, H, and color channels, C (e.g., RGB), such as 32×32×3), and/or a batch size, B (e.g., where batching is used)

One or more layers 126 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 126 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 126 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the convolutional network 104A may not include any pooling layers. In such examples, strided convolution layers may be used in place of pooling layers. In some examples, the feature extractor layer(s) 126 may include alternating convolutional layers and pooling layers.

One or more of the layers 126 may include a fully connected layer. Each neuron in the fully connected layer(s) may be connected to each of the neurons in the previous volume. The fully connected layer may compute class scores, and the resulting volume may be 1×1×number of classes. In some examples, the feature extractor layer(s) 126 may include a fully connected layer, while in other examples, the fully connected layer of the convolutional network 104A may be the fully connected layer separate from the feature extractor layer(s) 126. In some example, no fully connected layers may be used by the feature extractor 126 and/or the machine learning model 104A as a whole, in an effort to increase processing times and reduce computing resource requirements. In such examples, where no fully connected layers are used, the machine learning model 104A may be referred to as a fully convolutional network.

One or more of the layers 126 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 102) to the convolutional network 104B, or used to up-sample to the input spatial resolution of a next layer.

Although input layers, convolutional layers, pooling layers, ReLU layers, deconvolutional layers, and fully connected layers are discussed herein with respect to the feature extractor layer(s) 126, this is not intended to be limiting. For example, additional or alternative layers 126 may be used in the feature extractor layer(s) 126, such as normalization layers, SoftMax layers, and/or other layer types.

The output of the feature extractor layer(s) 126 may be an input to boundary point layer(s) 128 and/or class label layer(s) 130. The boundary point layer(s) 128 and/or the class label layer(s) 130 may use one or more of the layer types described herein with respect to the feature extractor layer(s) 126. As described herein, the boundary point layer(s) 128 and/or the class label layer(s) 130 may not include any fully connected layers, in some examples, to reduce processing speeds and decrease computing resource requirements. In such examples, the boundary point layer(s) 128 and/or the class label layer(s) 130 may be referred to as fully convolutional layers.

Different orders and numbers of the layers 126, 128, and 130 of the convolutional network 104A may be used depending on the embodiment. For example, for a first vehicle, there may be a first order and number of layers 126, 128, and/or 130, whereas there may be a different order and number of layers 126, 128, and/or 130 for a second vehicle; for a first camera, there may be a different order and number of layers 126, 128, and/or 130 than the order and number of layers for a second camera. In other words, the order and number of layers 126, 128, and/or 130 of the convolutional network 104A is not limited to any one architecture.

In addition, some of the layers 126, 128, and/or 130 may include parameters (e.g., weights and/or biases)—such as the feature extractor layer(s) 126, the boundary point layer(s) 128, and/or the class label layer(s) 130—while others may not, such as the ReLU layers and pooling layers, for example. In some examples, the parameters may be learned by the machine learning model(s) 104A during training. Further, some of the layers 126, 128, and/or 130 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tanh), exponential linear unit (ELU), etc. The parameters, hyper-parameters, and/or activation functions are not to be limited and may differ depending on the embodiment.

In any example, the output of the machine learning model 104A may be the boundary points 106 and/or the class labels 108. In some examples, the boundary point layer(s) 128 may output the boundary points 106 and the class label layer(s) 130 may output the class labels 108. As such, the feature extractor layer(s) 126 may be referred to as a first convolutional stream, the boundary point layer(s) 128 may be referred to as a second convolutional stream, and/or the class label layer(s) 130 may be referred to as a third convolutional stream.

In some examples, such as where there are two or more boundaries regressed on by the machine learning model(s) 104, for each boundary, there may be a separate stream of boundary point layer(s) and/or class label layer(s) (not shown). For example, for a second boundary in addition to the first boundary, a fourth convolutional stream of boundary point layer(s) may be used to determine the boundary points 106 for the second boundary, and a fifth convolutional stream of class label layer(s) 130 may be used to determine the associated class labels 108 for the second boundary. As such, for each boundary, there may be associated boundary point layer(s) and/or class label layer(s). In such examples, an additional class, or an additional parameter, may be learned by the machine learning model(s) 104 for traversable or non-traversable boundaries. For example, some boundaries separating drivable free-space from non-drivable space may be traversable, such as a curb, a grass or gravel area, etc., while other boundaries may be non-traversable, such as building, vehicle, pedestrians, etc. As such, the machine learning model(s) 104 may be trained to determine parameters associated with boundary classes or types, such as traversable and non-traversable boundary classes or types, in addition to, or alternatively from, determining the classes themselves (e.g., vehicles, pedestrians, curbs, barrier, etc.).

Now referring to FIG. 1C, FIG. 1C is another illustration of an example machine learning model 104B for boundary identification, in accordance with some embodiments of the present disclosure. The machine learning model 104B may be a non-limiting example of the machine learning model(s) 104 for use in the process 100 of FIG. 1A. The machine learning model 104B may be a convolutional neural network and thus may be referred to herein as convolutional neural network 104B or convolutional network 104B. In some examples, the convolutional network 104B may include any number and type of different layers, although some examples do not include any fully connected layers in order to increase processing speeds and reduce computing requirements to enable the process 100 to run in real-time (e.g., at 30 fps or greater).

The convolutional network 104B may include feature extractor layer(s) 132, boundary point layer(s) 134, and/or class label layer(s) 136, which may correspond to the feature extractor layer(s) 126, the boundary point layer(s) 128, and/or the class label layer(s) 130 of FIG. 1B, respectively, in some examples. The feature extractor layer(s) 132 may include any number of layers, however, in some examples, the feature extractor layers 132 include eighteen or less layers or less layers in order to minimize data storage requirements and to increase processing speeds for the convolutional network 104B. In some examples, the feature extractor layer(s) 132 includes convolutional layers that use 3×3 convolutions for each of its layers, with the exception of the first convolutional layer, in some examples, which may use a 7×7 convolutional kernel. In addition, in some example, the feature extractor layer(s) 132 may not include any skip-connections, which differs from conventional systems and may increase the processing times and accuracy of the system.

In some examples, the feature extractor layer(s) 132 may be similar to the structure illustrated in FIG. 8, and described in the accompanying text, of U.S. Provisional Patent Application No. 62/631,781, entitled "Method for Accurate Real-Time Object Detection and for Determining Confidence of Object Detection Suitable for Autonomous Vehicles", filed Feb. 18, 2018 (hereinafter the '781 Application). However, in some examples, the feature extractor layer(s) 132 of the present disclosure may include a network stride of 32, as compared to 16 in the structure of the '781 Application (e.g., the input may be down-sampled by 32 instead of 16). By using 16, rather than 32 as the stride, the convolutional network 104B may be computationally faster while not losing much, if any, accuracy. In addition, in some examples, the feature extractor layer(s) 132 may use an applied pool size of 2×2, rather than 3×3 as disclosed in the '781 Application.

The feature extractor layer(s) 132 may continuously down sample the spatial resolution of the input image until the output layers are reached (e.g., down-sampling from a 960×544×3 input spatial resolution to the feature extractor layer(s) 132, to 480×272×64 at the output of the first feature extractor layer, to 240×136×64 at the output of the second feature extractor layer, to 30×17×12 as output of the last of the feature extractor layer(s) 132). The feature extractor layer(s) 132 may be trained to generate a hierarchical representation of the input image(s) (or other sensor data representations) received from the sensor data 102 and/or pre-processed sensor data with each layer generating a higher-level extraction than its preceding layer. In other words, the input resolution across the feature extractor layer(s) 132 (and/or any additional or alternative layers) may be decreased, allowing the convolutional network 104B to be capable of processing images faster than conventional systems.

The boundary point layer(s) 134 and/or the class label layer(s) 136 may take the output of the feature extractor layer(s) 132 as input. The boundary point layer(s) 134 may be used to regress on the boundary points 106 and the class label layer(s) 136 may be used to predict class labels 108 that may correspond to the boundary points 106 regressed on by the boundary point layer(s) 132. The boundary point layer(s) 134 and/or the class label layer(s) 136 may include any number or type of layers, but in some examples, the boundary point layers 134 and/or the class label layer(s) 136 may include three layers.

For example, for the boundary point layer(s) 134, a first layer, Conv. 128, may reduce the number of feature maps from the output of the feature extractor layer(s) 132. A second layer, Deconv. 1, may up-sample the input from the first layer along the width, in order to get one point along each column of the image (e.g., based on the spatial width, and thus the number of columns of pixels, of the input to the machine learning model 104B, such as the sensor data 102). The third or output layer, Cony. 1, may reduce the height of the output array to one.

For the class label layers 136, a first layer, Conv. 128, may reduce the number of feature maps from the output of the feature extractor layer(s) 132. A second layer, Deconv. 4 may up-sample the input from the first layer along the width, in order to get a number of class label predictions along each column of the image that corresponds to the number of classes the machine learning model 104B was trained to predict (e.g., in this example, the number of classes may be four). The third or output layer, Cony. 4, may reduce the height of the output array to the number of classes the machine learning model 104B is trained to predict (e.g., four) such that for each column, the output array includes a confidence or probability for each boundary class or type for the corresponding boundary point 106 from the corresponding column in the output of the boundary point layers 134.

In some examples, with reference to FIG. 1D, the output of the machine learning model(s) 104 may include the boundary points 106 and the class label(s) 108. For example, the output of the boundary points 106, as described herein, may include a one dimensional array having one row 138 and a number (1-N) of columns 140 corresponding to the spatial width of the input image to the machine learning model(s) 104. For example, if the input image has a spatial width dimension of 1080 pixels, then N may be 1080. As such, each cell of the array may include a value (from 0 to 1) that corresponds to a percentage of the spatial height of the input image where the boundary point 106 is located (e.g., the pixel that corresponds to the first boundary in the column, from bottom to top, that separates drivable free-space from non-drivable space). As an example, column 140(1) may correspond to the first column of pixels in the input image, and may have a value of 0.4 (e.g., 40% of the height). As such, if the spatial height dimension of the image were 920 pixels, then the $368^{th}$ pixel (e.g., 40% of 920) from the bottom of the column 140(1) may be identified as the boundary point 106 for the column 140(1) of the input image.

As another example, the output of the class labels 108, as described herein, may include a two dimensional array having a number (1-K) of rows 142 corresponding to a number of boundary classes or types the machine learning model(s) 104 is trained to predict. As such, each row may correspond to a different boundary class or type. The number (1-M) of columns 144 may correspond to the spatial width of the input image to the machine learning model(s) 104. For example, if the machine learning model(s) 104 is trained to predict five classes, then K may be 5, and if the input image has a spatial width dimension of 1080 pixels, then M may be 1080.

As such, each cell of the array may include a value (from 0 to 1) that corresponds to a confidence or probability of the boundary point 106 of the corresponding column 140 in the boundary point array belonging to the boundary class or type associated with the row 142. As an example, column 144(1) may correspond to column 140(1) of the boundary point array, and row 142(1) may correspond to a class label 108 for pedestrians. As such, the value, 0.7, of the cell at row 142(1) and column 144(1) may correspond to a confidence or percentage that the boundary class or type of the boundary point of row 138, column 140(1) of the boundary point array is a pedestrian boundary class or type. In this example, assuming that 0.7 is the highest value, the determination may be that the boundary point 106 at row 138, column 140(1) of the boundary point array corresponds to a pedestrian.

This process or correlating boundary point locations with class labels may be performed for each of the columns of the input image. As a result, and after post-processing in some examples, the drive stack 146 may determine one or more operations for navigating or controlling the vehicle 700 based on the pixel locations of the boundary points 106 in the input image and the class labels 108 determined to be associated therewith.

Figure 2:
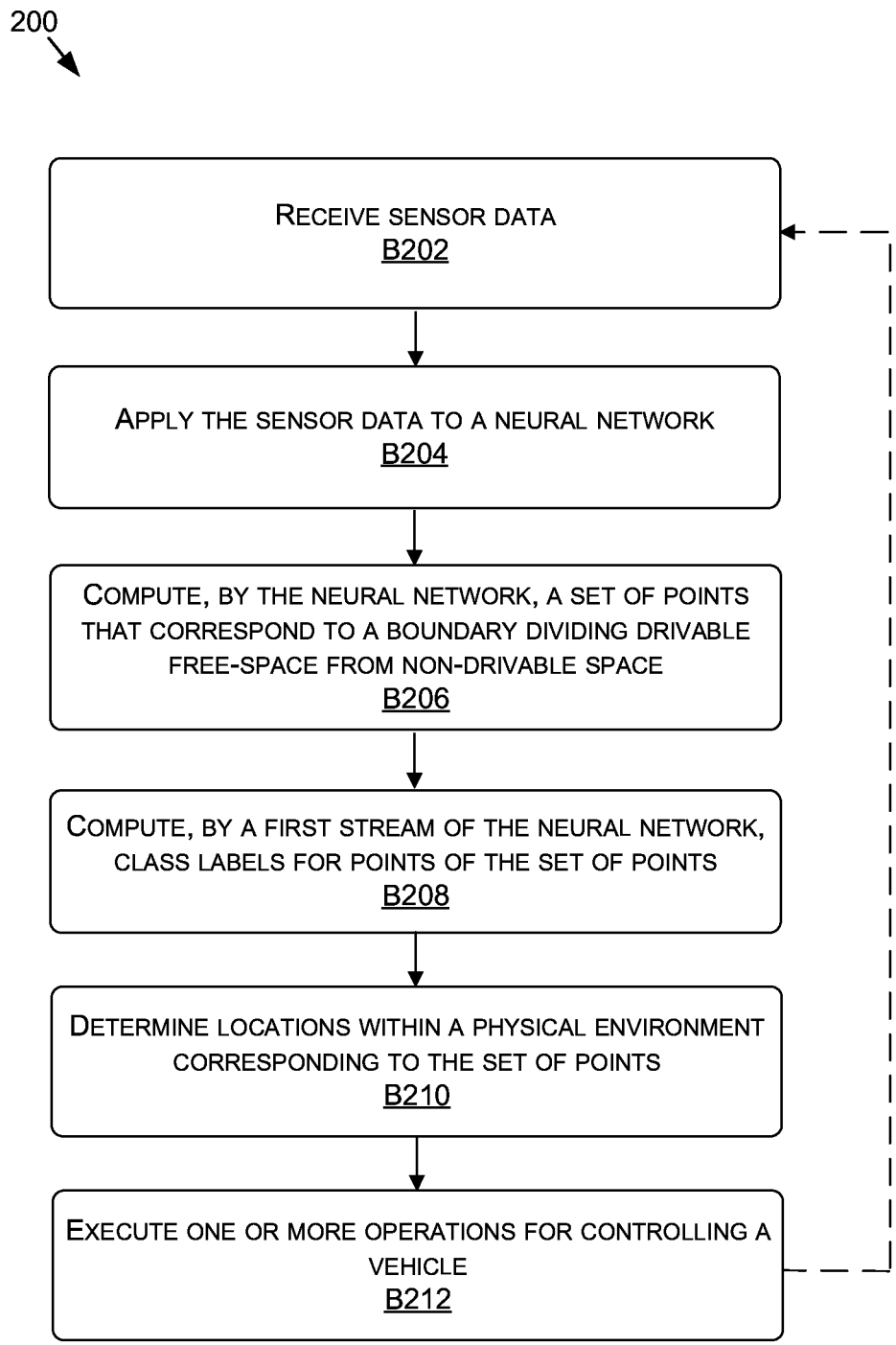
FIG. 2 is an example flow diagram for a method of determining a boundary, in accordance with some embodiments of the present disclosure.

Now referring to FIG. 2, each block of method 200, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 200 is described, by way of example, with respect to the process 100 of FIG. 1A. However, the method 200 may additionally or alternatively be executed by any one system, or any combination of systems, including, but not limited to, those described herein.

FIG. 2 is an example flow diagram for a method 200 of determining a boundary, in accordance with some embodiments of the present disclosure. The method 200, at block B202, includes receiving sensor data. For example, the sensor data 102 and/or pre-processed sensor data may be received. The sensor data may be captured by one or more sensors of the vehicle 700 and may represent a field(s) of view of the sensor(s), or may otherwise represent one or more aspect of the physical environment (e.g., for a GPS sensor, the sensor data may represent coordinates or locations within the physical environment). For example, the sensor data 102 may include image data representative of image(s) of a field(s) of view of one or more cameras of the vehicle 700.

The method 200, at block B204, includes applying the sensor data to a neural network. For example, the sensor data and/or the pre-processed sensor data may be applied to the machine learning model(s) 104. The machine learning model(s) 104, as described herein, may be trained to compute the boundary points 106 and the class labels 108.

The method 200, at block B206, includes computing, by a first stream of the neural network, a set of points that correspond to a boundary driving drivable free-space from non-drivable space. For example, the machine learning model(s) 104 may compute, based on the sensor data, the boundary points 106 for one or more boundaries. The boundary points 106 may be computed by a first stream (e.g., the boundary point layers 128) of the machine learning model(s) 104.

The method 200, at block B208, includes computing, by a second stream of the neural network, class labels for points of the set of points. For example, the machine learning model(s) 104 may compute, based on the sensor data, class labels 108 that correspond to the boundary points 106. The class labels 108 may be computed by a second stream (e.g., the class label layers 130) of the machine learning model(s) 104.

The method 200, at block B210, includes determining locations within a physical environment corresponding to the sets of points. For example, the point or pixel locations determined from the boundary points 106 may be used to determine corresponding locations within the real-world environment for the boundary dividing drivable free-space from non-drivable space.

The method 200, at block B212, includes executing one or more operations for controlling the vehicle. For example, one or more operations may be executed for controlling the vehicle 700 within the real-world environment. In some examples, the class labels and real-world locations determined from the locations of the boundary points 106 may be used by the drive stack 146 to determine the one or more operations (e.g., world model updates, trajectories, controls, actuations, etc.).

The method 200 may repeat, as indicated by the dashed arrow, for each sensor data input.

Training the Machine Learning Model(s)

In some examples, the machine learning model(s) 104 (e.g., a neural network(s)) may be trained with training images (e.g., training images 300A, 300B, and/or 500) that include an image and one or more associated annotations, labels, or masks. For example, annotations may be associated with the image and the training images and may be used as ground truth data for training the machine learning model(s) 104. The annotations for the training images may be generated within a drawing program (e.g., an annotation program), a computer aided design (CAD) program, a labeling program, another type of program suitable for generating the annotations, and/or may be hand drawn, in some examples. In any example, the annotations may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human formulates one or more rules or labeling conventions, machine generates annotations).

The outputs of the machine learning model(s) 104 may be compared against the ground truth data (e.g., the training images) using one or more loss functions. For example, the machine learning model(s) 104 may be trained with the training images using multiple iterations until the value of a loss function(s) of the machine learning model(s) 104 is below a threshold loss value (e.g., acceptable loss).

For example, the machine learning model(s) 104 may perform forward pass computations on the representations (e.g., image(s)) of the sensor data 102 and/or pre-processed sensor data to generate the boundary points 106 and the class labels 108. The loss function(s) may be used to measure error in the predictions of the machine learning model(s) 104 using ground truth data, as described in more detail herein with respect to at least FIGS. 3A-6. In some examples, a cross entropy loss function (e.g., binary cross entropy) and/or an L1 loss function may be used.

In some examples, different loss functions may be used for the boundary points 106 and the class labels 108. For example, the boundary points 106 may be associated with an L1 loss function, represented by the relationship of equation (13), below:

$$L1 \text{Loss}: L(y, x) = |y - f_w(x)| \tag{13}$$

where y is an array of ground truth boundary points based on the annotations, || is the absolute value function, and $f_w$ is an array of predicted boundary points 106 output by the machine learning model(s) 104 (e.g., the boundary point array of FIG. 1D).

As another example, the class labels 108 may be associated with a cross entropy loss function, represented by the relationship of equation (14), below:

$$\text{Cross Entropy Loss:} L(y,x) = -\Sigma_{i=1}^{n} y_i \log(f_{i,w}(x)) \quad (14)$$

where $y_i$ is a binary indicator (1 or 0) if i is the class label for the input, x, $f_{i,w}$ is the probability that the machine learning model(s) 104 predicts that i is the class label for the input, x, and log denotes the logarithmic function.

In some examples, a weighted combination of both the boundary point loss function (e.g., L1 loss) and the class label loss function (e.g., cross entropy loss) may be used to compute the final loss. For example, a weight ratio of 1:10 (e.g., boundary point:class label), may be used. However, this is not intended to be limiting any other weighting ratios may be used without departing from the scope of the present disclosure. In some examples, an auto-weight scheme may be used that adjusts cost weights adaptively or automatically when given only the target weight ratios for the weighted losses.

For example, a boundary point cost and corresponding cost weight may be denoted by $L_{boundary}$ and $w_{boundary}$, respectively, and the class label cost and corresponding cost weight may be denoted by $L_{label}$ and $w_{label}$, respectively. In such an example, the weights, w, may be selected such that the relationship of equation (15) is satisfied:

$$\frac{L_{boundary} w_{boundary}}{L_{label} w_{label}} = K_{boundary} \quad (15)$$

where $K_{boundary}$ is the target ratio for the weighted loss. As a result, since the weights also need to have a sum of one, the follow expressions of equations (16) and (17) may be derived:

$$w_{boundary} = \frac{K_{boundary} L_{label}}{K_{boundary} L_{label} + L_{boundary}} \quad (16)$$

$$w_{label} = \frac{L_{boundary}}{K_{boundary} L_{label} + w L_{boundary}} \quad (17)$$

This rule may be used periodically, such as once per training epoch, to set the weights. As such, the costs in the rule may be calculated from the training data (e.g., the ground truth data) to prevent overfitting to the training data. The weights may thus be set adaptively in a way that, after convergence, the desired target ratio for the weighted losses may be achieved.

Backward pass computations may be performed to recursively compute gradients of the loss function with respect to training parameters. In some examples, weights and biases of the machine learning model(s) 104 may be used to compute these gradients. In some examples, an optimizer may be used to make adjustments to the training parameters (e.g., weights, biases, etc.). For example, one or more of an Adam optimizer, stochastic gradient descent, or stochastic gradient descent with a momentum term, may be used. The training process may be reiterated until the trained parameters converge to optimum, desired, and/or acceptable values.

Figure 3A:
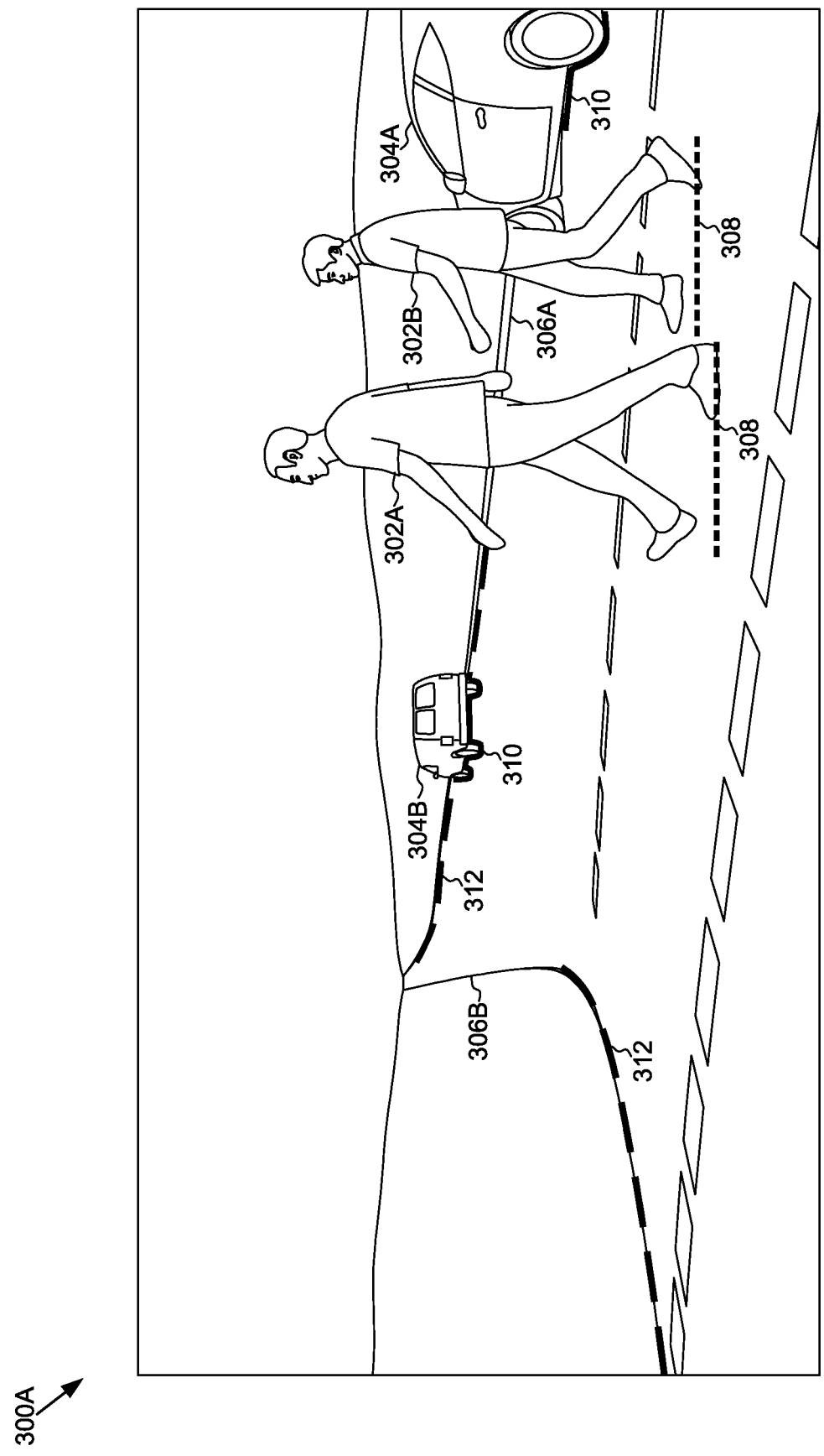
FIG. 3A is an example training image for a machine learning model, in accordance with some embodiments of the present disclosure.

Now referring to FIG. 3A, FIG. 3A is an example training image 300A for a machine learning model, in accordance with some embodiments of the present disclosure. The annotations associated with the image may include annotating, along each column of pixels of the image, from bottom to top of the image, one point corresponding to a first location of a boundary dividing drivable free-space from non-drivable space. As a result, once a point is identified and labeled in each column, a full boundary may be labeled. The annotations may include associated class labels such that each point along the boundary has an associated boundary class or type (e.g., pedestrian, vehicle, curb, barrier, catchall, etc.). In some examples, the annotations may include segmented or discontinuous boundaries (e.g., so long as one pixel for each column of pixels of the image includes an annotation), while in other examples, the annotations may include continuous boundary curves (e.g., the segments may be connected to form a continuous curve).

With respect to the training image 300A, and assuming the machine learning model(s) 104 is trained to predict at least three classes (e.g., pedestrians, vehicles, and/or curbs or barriers), the training image 300A may include associated annotations 312 for a curb or barrier 306 class label (e.g., as indicated by the curb or barrier 306A and 306B), annotations 310 for a vehicle 304 class label (e.g., as indicated by the vehicles 304A and 304B), and annotations 308 for a pedestrian 302 class label (e.g., as indicated by the pedestrians 302A and 302B). In some examples, the annotations may conform to the shape or contour of the boundary (e.g., the annotations 312 for the barriers 306 and the annotations 310 for the vehicle 304), while in other examples, such as where the boundary class or type is more difficult to delineate, the annotations may not conform to the shape or contour of the boundary (e.g., the annotations 308 for the pedestrians 302). Where the annotations do not conform to the shape or contour of the boundary, line segments (e.g., curved line segments, straight line segments, etc.), may be used. In the example of the pedestrians 302, the annotations 308 may include straight line segments that extend along the lateral dimension of the pedestrians from a bottom most portion of the pedestrian 302 (e.g., from a point closest to the bottom of the image and thus closest to the vehicle 700 in real-world coordinates). For example, even though an annotation following a gap between legs of the pedestrian 302A may most closely conform to the shape of the pedestrian 302A, the straight line annotation 308 may be used to ensure safety and accuracy. More specifically, the annotations 308, or other similar annotations for other boundary types (e.g., vehicles, in some examples), may be done in order to prevent any space occupied by any portion of the pedestrian 302A from being determined to be drivable free-space. Especially with respect to dynamic objects, undershooting the predicted drivable free-space may be preferable to overshooting.

In some examples, such as where a road or driving surface extends into a horizon, the annotations and/or the training image may be truncated or clamped. For example, a percentage of the top of the image and/or the associated annotations may be removed, and/or the machine learning model(s) 104 may be trained to ignore, or give less weight to, the upper clamped or truncated portions of the image. As a result, the drive stack 146 may not take into account, or may take into account to a lesser degree, the determined boundary points 106 and/or class labels 108 at further distances.

Figure 3B:
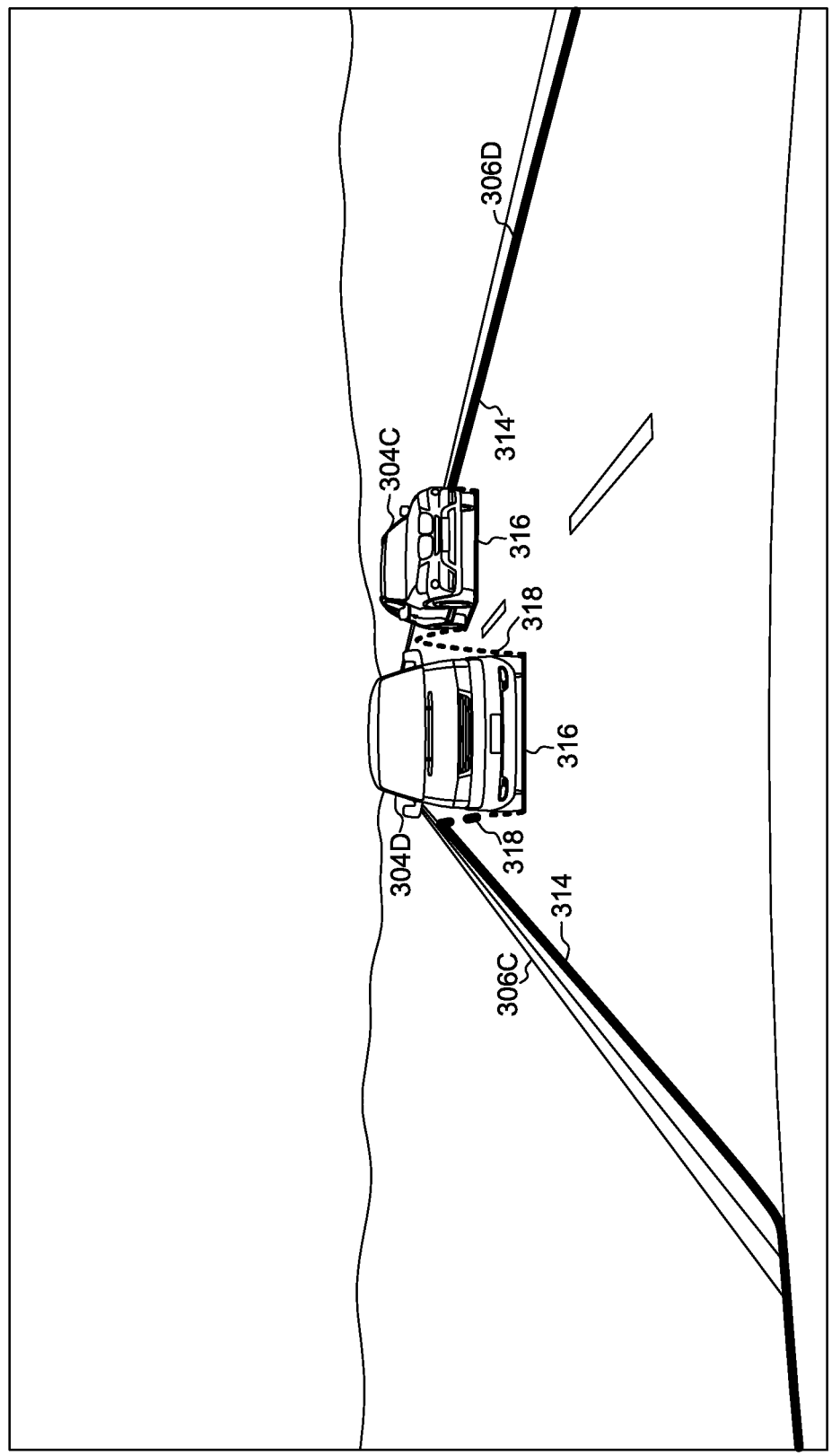
FIG. 3B is another example training image for a machine learning model, in accordance with some embodiments of the present disclosure.

FIG. 3B is another example training image 300B for a machine learning model, in accordance with some embodiments of the present disclosure. With respect to the training image 300B, and assuming the machine learning model(s) 104 is trained to predict at least three classes (e.g., vehicles, curbs or barriers, and a catchall class), the training image 300B may include associated annotations 314 for a curb or barrier 306 class label (e.g., as indicated by the curb or barrier 306C and 306D), annotations 316 for a vehicle 304 class label (e.g., as indicated by the vehicles 304C and 304D), and annotations 318 for a catchall class label. In some examples, such as in the training image 300B, an attempt may be made to train the machine learning model(s) 104 to avoid sharp or erratic changes between boundaries. As a result, the boundary points may be annotated such that the sharp transitions are avoided. With respect to the training image 300B, the boundary points between the vehicle 304D and the curb or barrier 306C, and the boundary points between the vehicle 304D and the vehicle 304C may have a smoother transition, as illustrated. In such examples, the portion of the boundary (e.g., corresponding to the annotations 318) that transitions between the vehicle 304D and the curb or barrier 306C and the portion of the boundary that transitions between the vehicle 304D and the vehicle 304C may be labeled as a catchall class (or may be labeled as a vehicle class to conform with the dynamic nature of the surrounding vehicles 304C and 304D). In any example, by training the machine learning model(s) 104 to determine less sharp or drastic changes between boundary types, and thus to determine a more smooth boundary output, the boundary dividing drivable free-space from non-drivable space may be more clearly understood by the vehicle 700 (e.g., by the drive stack 146).

Figure 4:
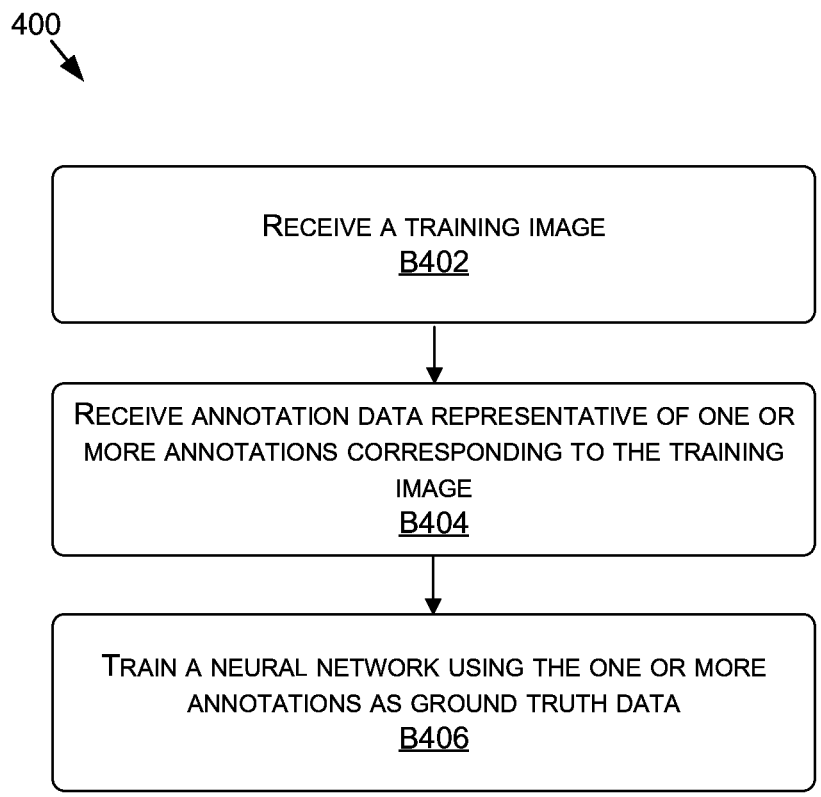
FIG. 4 is an example flow diagram for a method of training a machine learning model, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the process 100 of FIG. 1A. However, this method may additionally or alternatively be executed by any one system, or any combination of systems, including, but not limited to, those described herein.

FIG. 4 is an example flow diagram for a method 400 of training a machine learning model, in accordance with some embodiments of the present disclosure. The method 400, at block B402, includes receiving a training image. For example, a training image may be received that may have been generated by a vehicle (e.g., the vehicle 700 or another vehicle) or that may have been generated from a virtual environment.

The method 400, at block B404, includes receiving annotation data representative of one or more annotations corresponding to the training data. For example, annotation data may be received that represents one or more boundary labels that may correspond to annotated boundary points. In addition, annotation data may be received that represents class labels. For example, before, during, or after the annotating of the boundary points, class labels may be associated with the annotations of the boundary labels. In some examples, a different tool within a labeling program may be used depending on the boundary class or type that the annotated boundary label corresponds to. In such examples, the annotated boundary label may represent or be a contextual or semantic representation of the boundary class or type. The result of the annotations may be visually represented similar to the training images 300A and 300B.

The method 400, at block B406, includes training a neural network using the annotations as ground truth data. For example, the training images including the associated annotations may be used to train the machine learning model(s) 104 (e.g., using the loss functions described herein).

Figure 5:
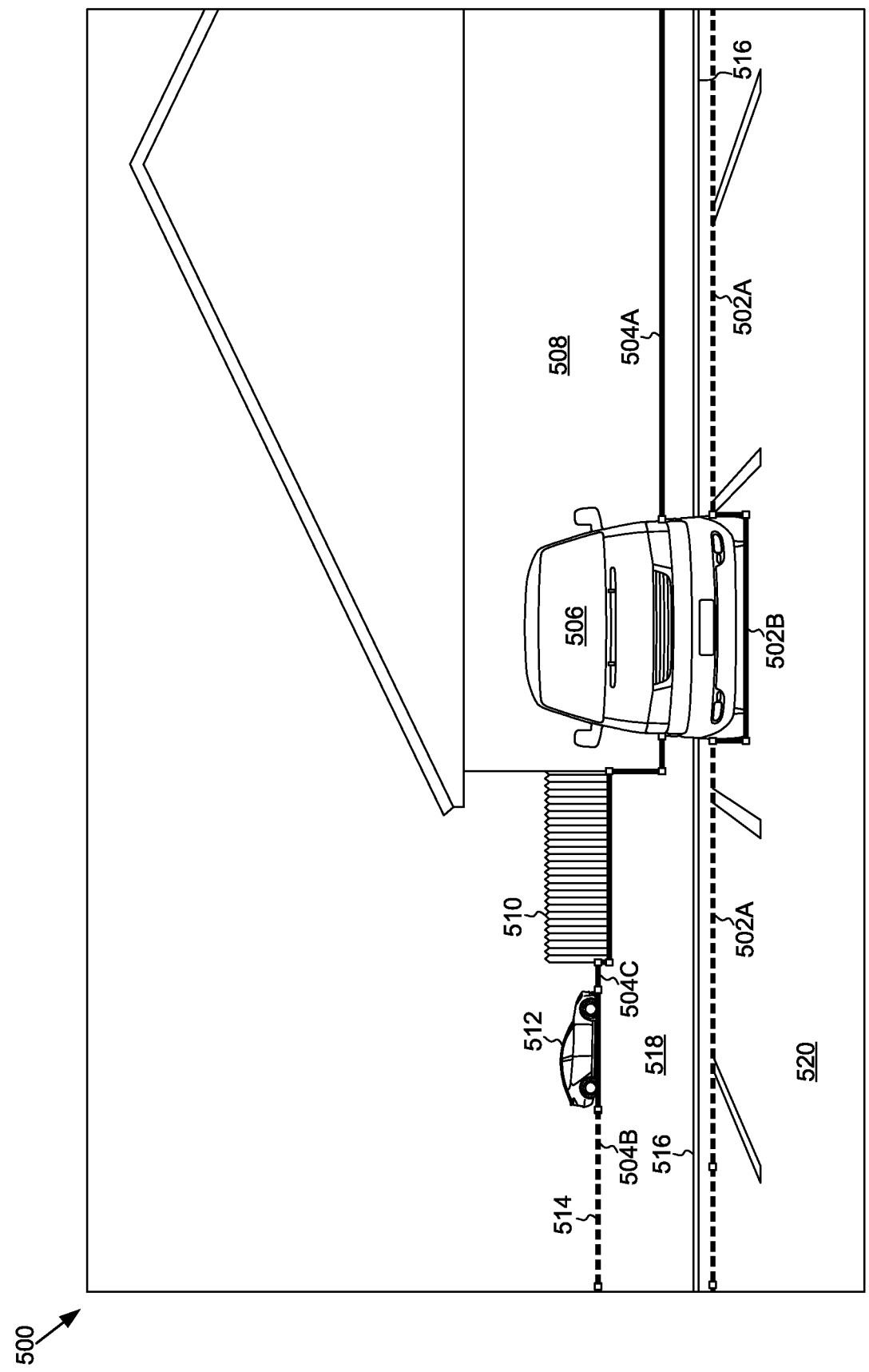
FIG. 5 is another example training image for a machine learning model, in accordance with some embodiments of the present disclosure.

Now referring to FIG. 5, FIG. 5 is another example training image 500 for a machine learning model, in accordance with some embodiments of the present disclosure. The training image 500 may include associated annotations for training the machine learning model(s) to predict two or more boundaries and associated class labels. For example, a first annotation 502 (indicated at least in part by segments 502A, 502B, and 502C) may correspond to a first boundary and a second annotation 504 (indicated at least in part by segments 504A, 504B, and 504C) may correspond to a second boundary may be generated for association with the image. In some examples, the machine learning model(s) 104 may be trained to generate additional boundaries, from top to bottom of the image, until a non-traversable boundary is determined, or until a threshold amount of the spatial width of the image includes non-traversable boundary segments (e.g., that may be a combination of segments from two or more different boundaries). In such examples, there may be additional annotations for each training image 500 corresponding to each of the boundaries. In other examples, the machine learning model(s) 104 may be trained to generate a set number of boundaries, such as two boundaries with respect to FIG. 5. In any example, the boundaries may be annotated similar to the training images 300A and 300B, described herein, and the training images 300A and 300B may be annotated similar to the training image 500.

The training image 500 may include the annotation 502 of the first boundary and the annotation 504 of the second boundary. Assuming that the machine learning model(s) 104 is trained to detect at least four classes and/or parameters (e.g., vehicles, curbs or barriers, traversable, non-traversable), the annotations 502 of the first boundary may include a curb or barrier 516 class label, a vehicle 506 class label, a class label or parameter for a non-traversable boundary type (e.g., the vehicle 506, along segment 502B), and/or a class label or parameter for a traversable boundary type (e.g., the curb or barrier 516, along segments 502A). Similarly, with respect to the second boundary, the annotations 504 may include a curb or barrier 514, 510, 508 class label, a vehicle 512 class label, a class label or parameter for a non-traversable boundary type (e.g., the vehicle 512, the curb or barrier 510 and 508, along segments 504A and 504C), and/or a class label or parameter for a traversable boundary type (e.g., the curb or barrier 514, along segments 504B).

In some examples, depending on a length of a segment of a boundary that is traversable (e.g., corresponding to the segment 504C of the annotation 504), the segment may be annotated as non-traversable. For example, even though the type of boundary (e.g., a curb) may be traversable, the surrounding information may be used to determine if the segment is actually traversable. In this example, the segment 504C may not be traversable, or may not safely be traversable, because a vehicle 512 and a barrier 510 may be immediately adjacent the segment 504C. As such, the segment 504C may be annotated as non-traversable.

In some examples, such as in the illustration of FIG. 5, there may be two or more drivable free-spaces. For example, there may be a first drivable free-space 520 and second drivable free-space 518. In such examples, the curb or barrier 516 may include a boundary separating the first drivable free-space 520 from the second drivable free-space 518. In some examples, there may be an additional boundary (not shown) identified on an opposite side of the curb or barrier 516 (e.g., opposite the boundary identified by the annotation 502). In such examples, the annotation 502 may correspond to a boundary dividing drivable free-space from non-drivable space, and the additional boundary may divide the non-drivable space from the second drivable free-space 518.

As another example, such as where a lane merge is captured in the sensor data, the area between the two-lanes prior to the merge may include non-drivable space. In such an example, the annotations may include annotating a first boundary dividing drivable free-space of a first lane from the non-drivable space of the area between the two lanes prior to merge, and a second boundary dividing the non-drivable space of the area from the drivable free-space of a second lane (e.g., the lane merging into the first lane). As such, the machine learning model(s) 104 may be trained to annotate more than one drivable free-space and/or the non-drivable space therebetween.

Figure 6:
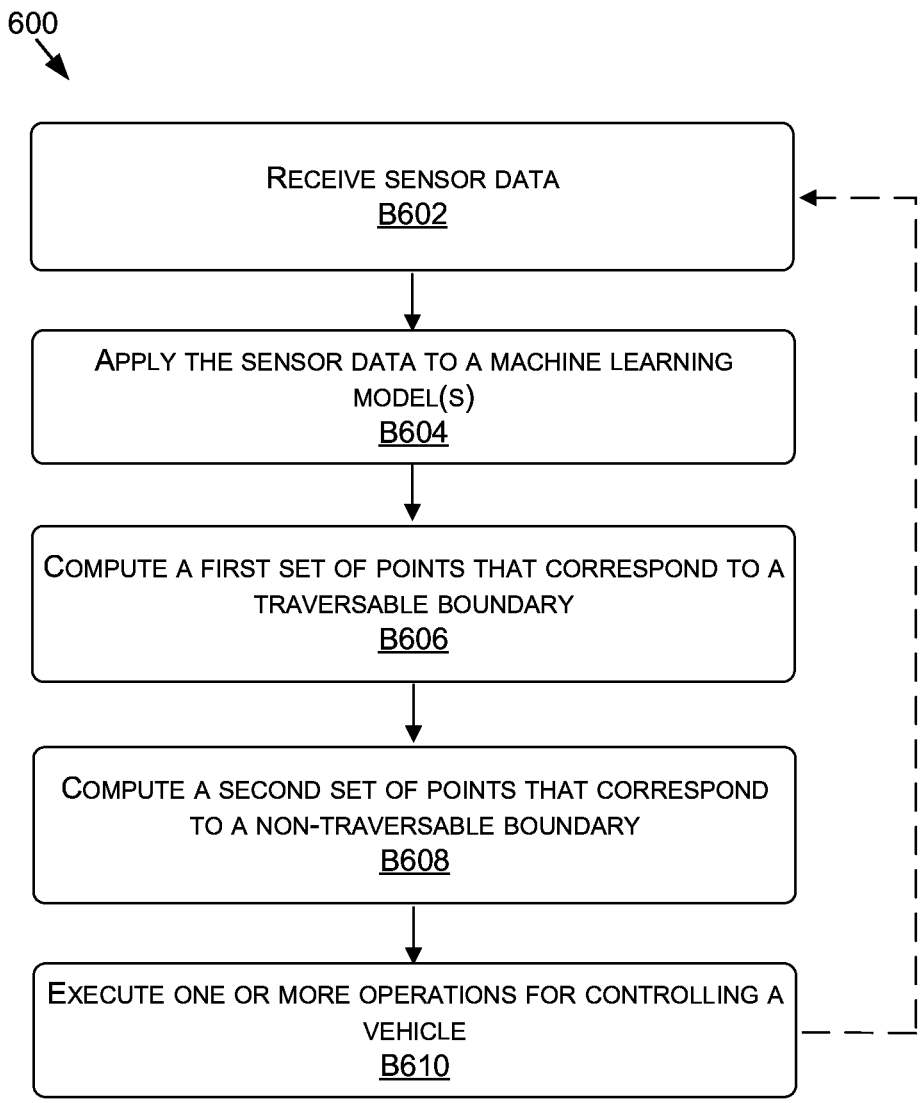
FIG. 6 is an example flow diagram for a method of detecting multiple boundaries, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the process 100 of FIG. 1A. However, this method may additionally or alternatively be executed by any one system, or any combination of systems, including, but not limited to, those described herein.

FIG. 6 is an example flow diagram for a method 600 for multiple boundary detection, in accordance with some embodiments of the present disclosure. The method 600, at block B602, includes receiving sensor data. For example, the sensor data 102 and/or pre-processed sensor data may be received. The sensor data may be captured by one or more sensors of the vehicle 700 and may represent a field(s) of view of the sensor(s). For example, the sensor data 102 may include image data representative of image(s) of a field(s) of view of one or more cameras of the vehicle 700.

The method 600, at block B604, includes applying the sensor data to a machine learning model(s). For example, the sensor data and/or the pre-processed sensor data may be applied to the machine learning model(s) 104. The machine learning model(s) 104, as described herein, may be trained to compute the boundary points 106 and the class labels 108 for one or more boundaries.

The method 600, at block B606, includes computing a first set of points that correspond to a traversable boundary. For example, a first set of boundary points may be computed by the machine learning model(s) 104 that correspond to a first boundary dividing drivable free-space from non-drivable space in the real-world environment that may be a traversable boundary. In some examples, the traversable boundary points may correspond to a single boundary, or may correspond to a portion of the first boundary and a portion of the second boundary.

The method 600, at block B608, includes computing a second set of points that correspond to a non-traversable boundary. For example, a second set of boundary points may be computed by the machine learning model(s) 104 that correspond to a second boundary dividing drivable free-space from non-drivable space in the real-world environment that may be a non-traversable boundary. In some examples, the non-traversable boundary points may correspond to a single boundary, or may correspond to a portion of the first boundary and a portion of the second boundary.

In some examples, the computing the first set of points at block B606 and the computing the second set of points at block B608 may be executed in parallel. For example, one or more GPUs may be used to compute the first set of points in parallel with the second set of points in order to increase processing speeds to enable the machine learning model(s) 104 to run in real-time.

The method 600, at block B610, includes executing one or more operations for controlling the vehicle. For example, one or more operations may be executed for controlling the vehicle 700 within the real-world environment. In some examples, the class labels and real-world locations determined from the locations of the boundary points 106 may be used by the drive stack 146 to determine the one or more operations (e.g., world model updates, trajectories, controls, actuations, etc.). The traversable and non-traversable labels may be useful for the vehicle 700 in determining the one or more operations, such as in emergency situations. For example, in an emergency, with respect to FIG. 5, the vehicle 700 may need to avoid a collision, and to do so, knowing that the boundary segment 502A is traversable as opposed to the non-traversable boundary segment 502B may be useful. In such an example, the vehicle 700 may maneuver over the curb or barrier 516 to avoid collision with a vehicle, pedestrian, or animal, for example, but may not maneuver toward the vehicle 506 in order to avoid a different collision.

The method 600 may repeat, as indicated by the dashed arrow, for each sensor data input.

Evaluation Metrics

In some examples, one or more evaluation metrics may be used to evaluate the machine learning model(s) 104 output and performance. For example, relative gap, precision, label accuracy, smoothness, weighted free-space precision (WFP), weighted free-space recall (WFR), and/or other metrics may be used. Relative gap may measure the average of the absolute deviation between a ground truth boundary curve, $y_i$ (e.g., the ground truth boundary points) and a predicted boundary curve, $\hat{y}_i$ (e.g., the boundary points 106 predicted by the machine learning model(s) 104, by taking a sum of the L1 loss norm ($\| \|$) and normalizing with the spatial width, N, of the input image (e.g., the width of the boundary point array) and a spatial height, H, of the input image. In some non-limiting examples, the relative gap may be determined according to equation (18), below:

$$\text{Relative Gap} = \sum_{i=1}^{N} \frac{\|y_i - \hat{y}_i\|}{N * H} \quad (18)$$

Precision may measure the amount of overshoot of the predicted boundary curve from the ground truth boundary curve (e.g., the amount of non-drivable space determined to be drivable free-space by the DNN). For example, overshoot should be avoided as non-drivable space may be considered drivable free-space when overshoot is present, which may decrease the safety of the system. As such, precision may be an evaluation metric that is used to ensure that overshoot is either nonexistent or is within acceptable bounds. In some non-limiting examples, precision may be determined according to equation (19), below:

$$\text{Precision} = \frac{\sum_{i=1}^{N}(H - \max(y_i, \hat{y}_i))}{\sum_{i=1}^{N}(H - y_i)} \quad (19)$$

where H is the height of the image, $y_i$ is the ground truth boundary curve, and $\hat{y}_i$ is the predicted boundary curve.

Label accuracy may measure the accuracy of the predicted boundary class labels in comparison to the ground truth boundary class labels. In some non-limiting examples, label accuracy may be determined according to equation (20), below:

$$\text{Label Accuracy} = \frac{1}{N_{class}} \sum_{i=1}^{N_{class}} \sum_{j=1}^{N_i} \frac{1(i = \hat{y}_j)}{N_i} \quad (20)$$

where $N_{class}$ is a total number of boundary classes or types, $N_i$ is a total number of boundary points labeled as class i, and $1(x)$ is an indicator function which is 1 when $\hat{y}_j$ (class for a boundary point labeled as class i) is equal to class i.

Smoothness may measure the smoothness of the predicted curve (e.g., the mean of the difference between consecutive boundary points of the boundary curve). In some non-limiting examples, smoothness may be determined according to equation (21), below:

$$\text{Smoothness} = \sum_{i=1}^{N-1} \frac{\|\hat{y}_{i+1} - \hat{y}_i\|}{N-1} \quad (21)$$

where $\hat{y}_i$ is the predicted boundary curve, $\|\,\|$ is the L1 norm, and N is the width of the curve (e.g., the spatial width of the input image).

With respect to WFP and WFR, these evaluation metrics may be based on the concept of drivability (e.g., traversable) and un-drivability (e.g., non-traversable) of obstacles. For example, boundary types or obstacles such as pedestrians or vehicles may have higher un-drivability than a curb. In addition, for WFP and WFR, in some examples, the weight for different boundary class labels may be different, such that some boundary classes or types have a higher associated weight. For example, pedestrians may have a higher associated weight than a curb because accuracy with respect to a human is more pertinent than with respect to a curb.

WFP may include a precision calculation using only overshoot, such that if there is no overshoot, the precision may be 1.0 (e.g., a near perfect match between ground truth and prediction). In some non-limiting examples, WFP may be determined according to equation (22), below:

$$WFP = \frac{\left(\sum_{(p\ in\ \phi)} OFW(p) * F(p) * P(p)\right)}{\left(\sum_{(p\ in\ \phi)} M\_OFW(p) * P(p)\right)} \quad (22)$$

where p is a boundary point (or pixel), $\Phi$ is all the boundary points, OFW is overshoot free-space weight, which may be different based on the boundary class or type, F(p) is a displacement score for p, M_OFW(p) is a maximum possible overshoot weight for p, and P(p) is in-path weight for p.

WFR may include a precision calculation using only undershoot, such that if there is no undershoot, the precision may be 1.0 (e.g., a near perfect match between ground truth and prediction). In some non-limiting examples, WFR may be determined according to equation (23), below:

$$WFR = \frac{\left(\sum_{(p\ in\ \phi)} UFW(p) * F(p) * P(p)\right)}{\left(\sum_{(p\ in\ \phi)} M\_UFW(p) * P(p)\right)} \quad (23)$$

where p is a boundary point (or pixel), $\Phi$ is all the boundary points, UFW is undershoot free-space weight, which may be different based on the boundary class or type, F(p) is a displacement score for p, M_UFW(p) is a maximum possible undershoot weight for p, and P(p) is in-path weight for p.

Example Autonomous Vehicle

FIG. 7A is an illustration of an example autonomous vehicle 700, in accordance with some embodiments of the present disclosure. The autonomous vehicle 700 (alternatively referred to herein as the "vehicle 700") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768, infrared camera(s) 772, etc.), as described herein.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK).

The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
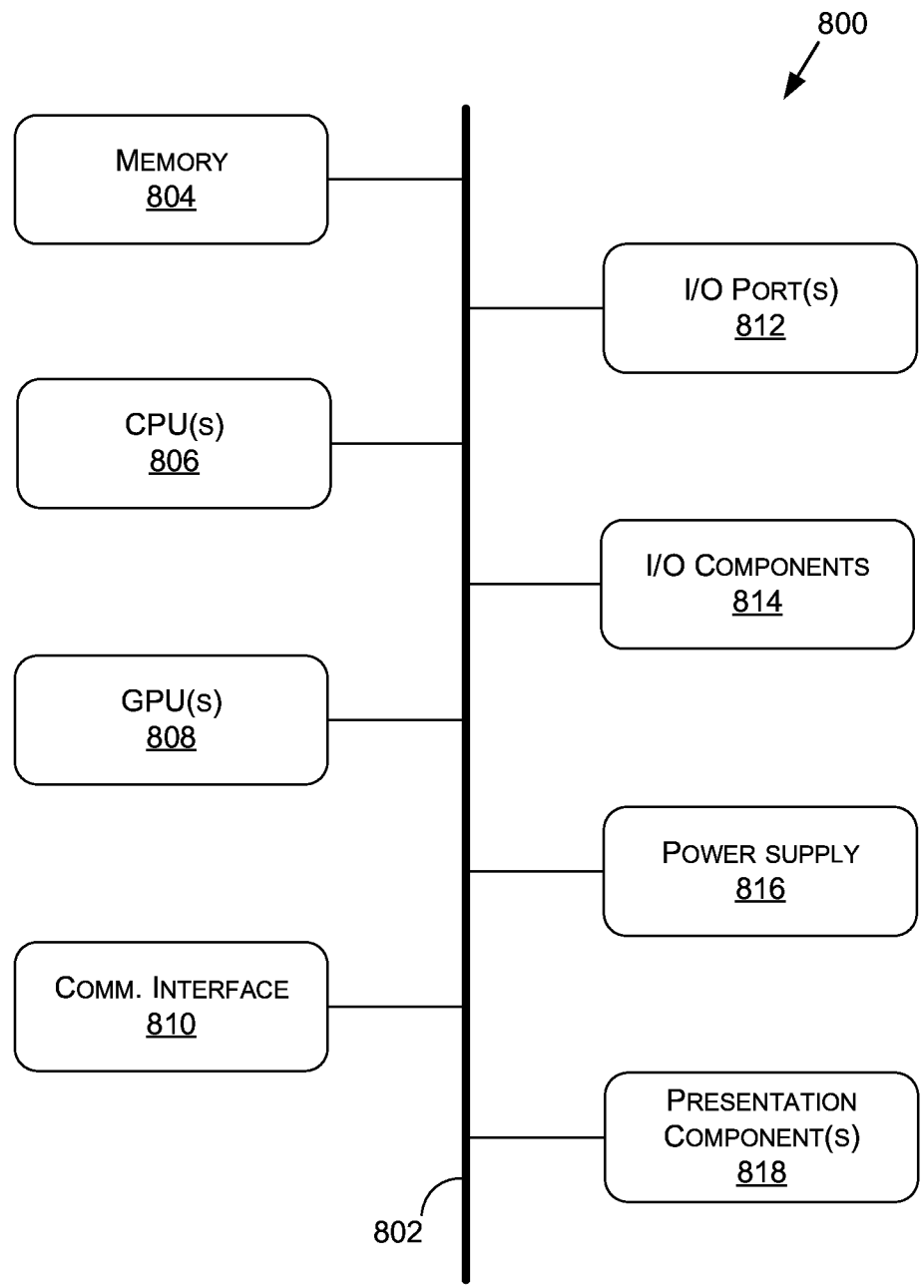
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link) When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving sensor data generated by one or more sensors of a vehicle in a physical environment;
   computing, by a first stream of a neural network and based at least in part on the sensor data, data representative of an array having one or more dimensions, at least one dimension of the one or more dimensions having a number of cells corresponding to a spatial width of an image, wherein at least one value in at least one cell along the at least one dimension corresponds to a height of a pixel corresponding to a respective boundary point;
   converting the values to pixel locations of a set of boundary points that correspond to a boundary dividing drivable free-space within the physical environment from non-drivable space within the physical environment;
   based at least in part on the pixel locations, determining real-world locations within the physical environment corresponding to the set of boundary points;
   computing, by a second stream of the neural network and based at least in part on the sensor data, data representative of confidences corresponding to object class labels for the set of boundary points; and
   executing one or more operations for controlling the vehicle through the physical environment based at least in part on the real-world locations and the object class labels.

2. The method of claim 1, wherein the set of boundary points is a first set of boundary points, the sensor data is first sensor data, and the method further comprises:
   weighting first values corresponding to the first set of the boundary points with second values corresponding to a second set of boundary points from second sensor data captured prior to the first sensor data to compute third values, wherein the determining the real-world locations within the physical environment is based at least in part on the third values.

3. The method of claim 1, further comprising:
   for at least a boundary point of the set of boundary points, applying a filter to a first value corresponding to the boundary point to generate an updated first value, the filter weighting a second value corresponding to at least one adjacent boundary point of the boundary point, wherein the determining the locations within the physical environment is based at least in part on the updated first value.

4. The method of claim 1, wherein the object class labels include at least one of pedestrian, curb, barrier, vehicle, structure, traversable, non-traversable, or a catchall.

5. The method of claim 1, wherein the neural network includes a convolutional neural network (CNN), and the CNN regresses on the at least one value.

6. The method of claim 1, wherein the sensor data includes image data representative of the image having the spatial width, and the confidences corresponding to the object class labels are computed for each object class label of the object class labels and for each column of the columns of the image.

7. The method of claim 1, wherein the set of boundary points is a first set of boundary points, the drivable free-space is a first drivable free-space, the non-drivable space is a first non-drivable space, and the method further comprises:
   computing, by a third stream of the neural network, a second set of boundary points represented by the sensor data that corresponds to a second boundary dividing a second drivable free-space within the physical environment from a second non-drivable space within the physical environment.

8. The method of claim 1, wherein the sensor data is representative of a number of columns, and the set of boundary points includes a boundary point from each column of the number of columns.

9. The method of claim 8, wherein a boundary point from each column is a single point, and the single point represents, ascending from a bottom of the image represented by the sensor data, a first point in the column corresponding to the boundary.

10. A method comprising:
    receiving a training image representative of a physical environment;
    receiving annotation data representative of one or more annotations corresponding to the training image, the one or more annotations including:
        a boundary label extending across a width of the training image and corresponding to at least one pixel in each column of pixels of the training image, the at least one pixel corresponding to, from bottom to top of the training image, a first boundary in the physical environment at least partially dividing drivable free-space from non-drivable space; and
        class labels corresponding to one or more segments of the boundary label, each class label corresponding to a boundary type associated with the one or more segments; and
    training a neural network using the one or more annotations as ground truth data.

11. The method of claim 10, wherein a segment of the one or more segments of the boundary label corresponds to a shape defined by the boundary type.

12. The method of claim 10, wherein a segment of the one or more segments of the boundary label includes a straight line extending along a portion of the training image that corresponds to the boundary type.

13. The method of claim 10, wherein the training of the neural network includes assigning a higher weight to output data from the neural network that has a first class label of the class labels than a second class label, and adjusting the neural network using the higher weight.

14. The method of claim 10, wherein:
    the neural network computes a first output corresponding to the class labels and a second output corresponding to a location of the boundary label within the training image; and
    the training the neural network includes using a first loss function associated with the first output and a second loss function associated with the second output.

15. The method of claim 14, wherein the training the neural network includes using a weighted combination of the first loss function and the second loss function to compute a final loss.

16. A method comprising:
    receiving sensor data representative of an image of a field of view of at least one sensor of vehicle in a physical environment;
    computing, by a first subset of layers of a neural network and based at least in part on the sensor data, a first set of boundary points that corresponds to a traversable boundary extending along an entire width of the image and dividing first drivable free-space within the physical environment from first non-drivable space within the physical environment;
    computing, by a second subset of layers of the neural network and based at least in part on the sensor data, a second set of boundary points that corresponds to a non-traversable boundary extending along the entire width of the image and dividing second drivable free-space within the physical environment from at least one of the first non-drivable space or second non-drivable space within the physical environment; and
    executing one or more operations for controlling the vehicle through the physical environment based at least in part on the traversable boundary and the non-traversable boundary.

17. The method of claim 16, wherein the controlling the vehicle through the physical environment includes traversing the traversable boundary.

18. The method of claim 16, wherein the first set of boundary points includes one point for each pixel column of the image and the second set of boundary points includes one point for each pixel column of the image.

19. The method of claim 16, wherein the non-traversable boundary is located further from the vehicle in the physical environment than the traversable boundary.

20. The method of claim 16, wherein the neural network further computes data representative of confidences that the first set of boundary points and the second set of boundary points correspond to at least one of a plurality of boundary classes, the plurality of boundary classes including at least a traversable class and a non-traversable class.

* * * * *